March 10, 1936.  H. R. BRAND ET AL  2,033,178
FOOD PREPARING MACHINE
Filed Nov. 28, 1932  17 Sheets-Sheet 1

INVENTORS
*HARRY R. BRAND*
BY *CHARLES A. FAUSEL*

ATTORNEY

March 10, 1936. H. R. BRAND ET AL 2,033,178
FOOD PREPARING MACHINE
Filed Nov. 28, 1932 17 Sheets-Sheet 2

INVENTORS
HARRY R. BRAND
BY CHARLES A. FAUSEL

H Russell Bond ATTORNEY

March 10, 1936. H. R. BRAND ET AL 2,033,178
FOOD PREPARING MACHINE
Filed Nov. 28, 1932 17 Sheets-Sheet 6
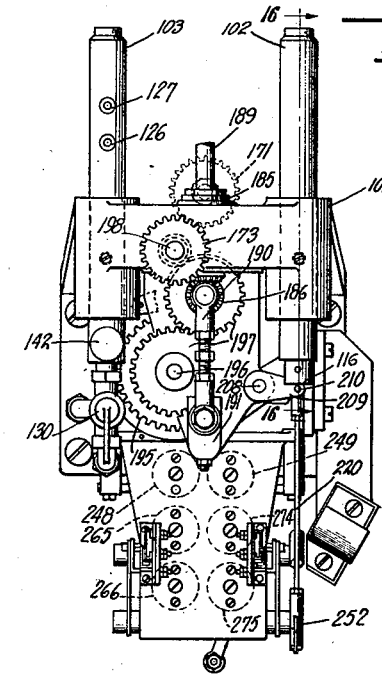
Fig. 6.
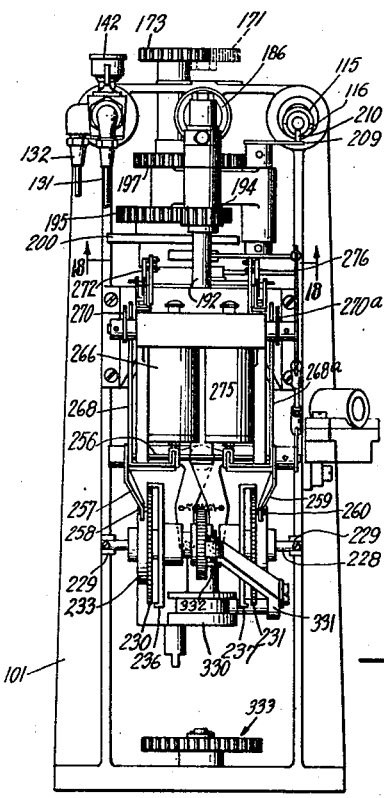
Fig. 7.
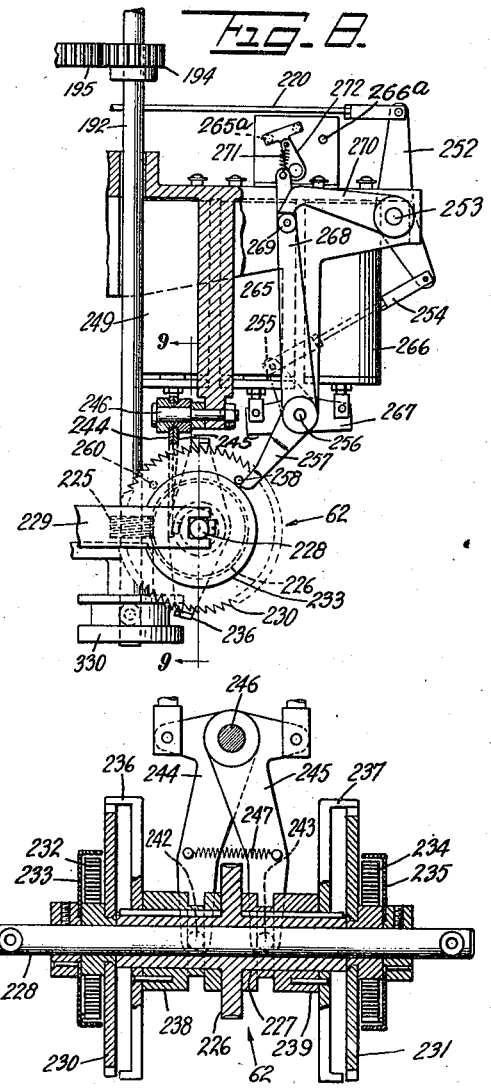
Fig. 8.
Fig. 9.
INVENTORS
HARRY R. BRAND
BY CHARLES A. FAUSEL
H. Russell Bond ATTORNEY

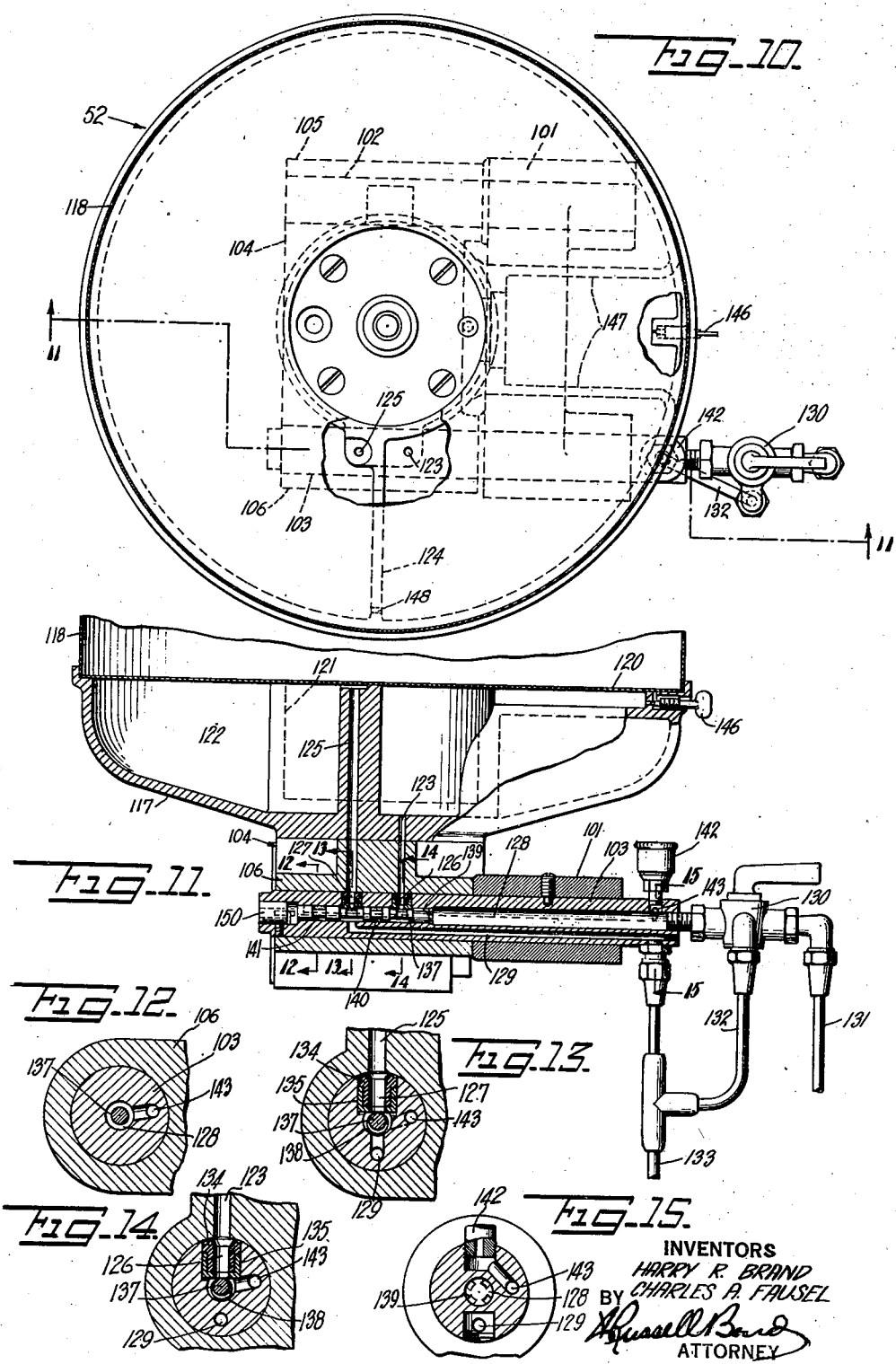

March 10, 1936.　　　H. R. BRAND ET AL　　　2,033,178
FOOD PREPARING MACHINE
Filed Nov. 28, 1932　　　17 Sheets-Sheet 8
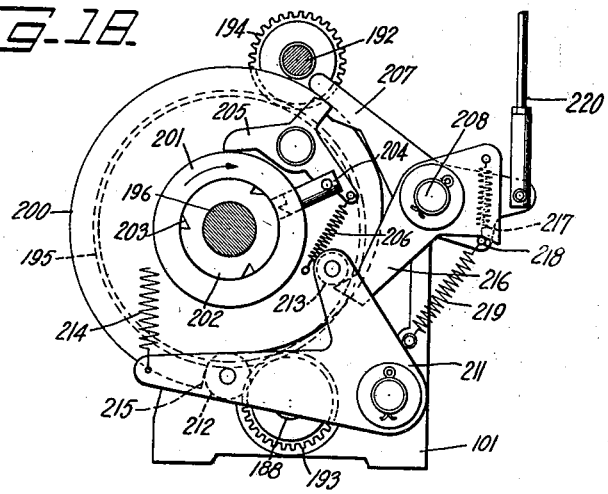
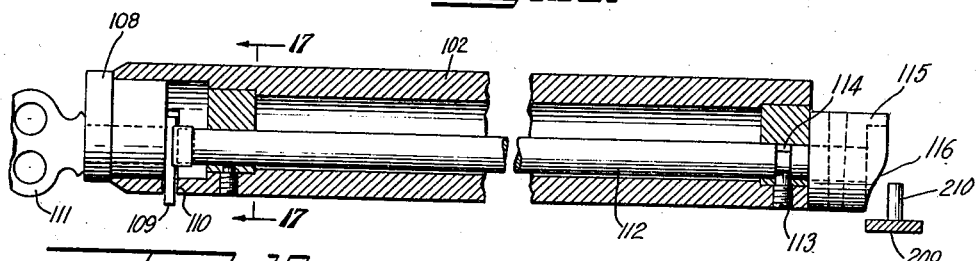
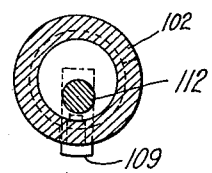
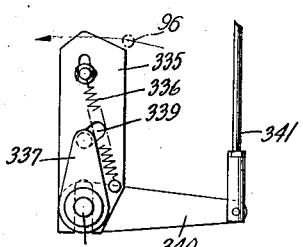
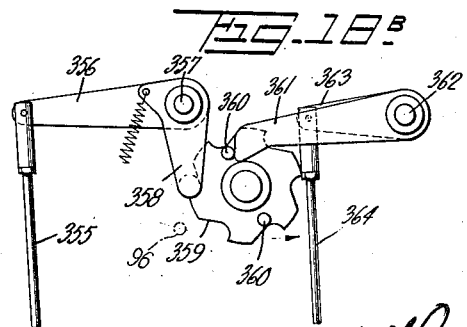
INVENTORS
HARRY R. BRAND
BY CHARLES A. FAUSEL
ATTORNEY

INVENTORS
HARRY R. BRAND
BY CHARLES A. FAUSEL

ATTORNEY

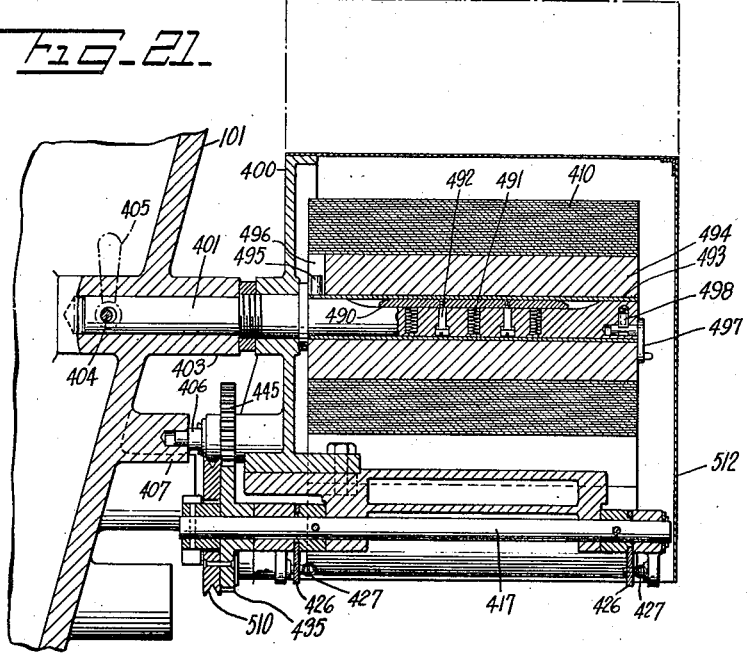
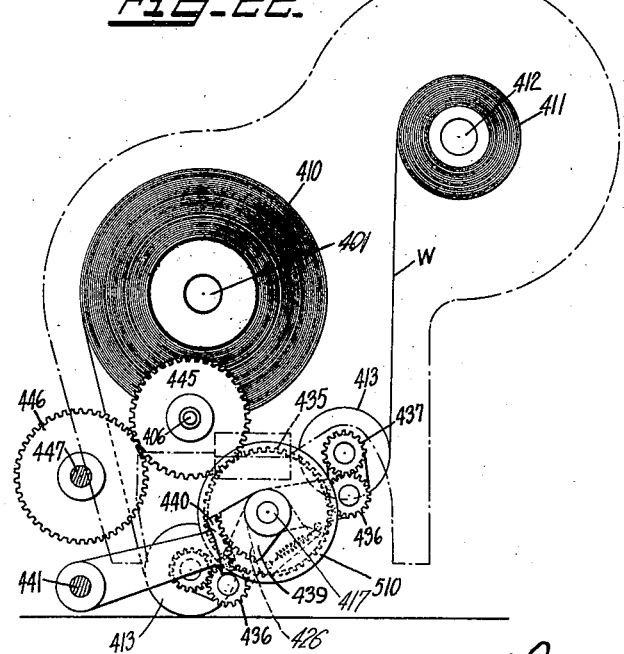

March 10, 1936.　　H. R. BRAND ET AL　　2,033,178
FOOD PREPARING MACHINE
Filed Nov. 28, 1932　　17 Sheets-Sheet 11

INVENTORS
HARRY R. BRAND
BY CHARLES A. FAUSEL
ATTORNEY

March 10, 1936.  H. R. BRAND ET AL  2,033,178
FOOD PREPARING MACHINE
Filed Nov. 28, 1932  17 Sheets-Sheet 12
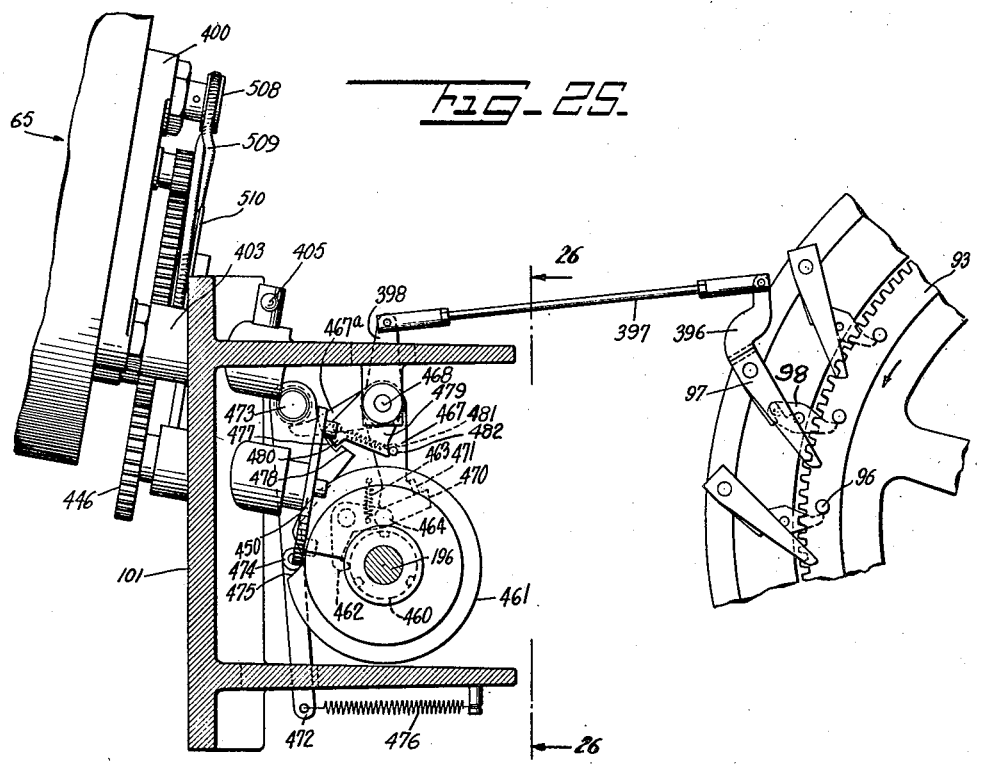
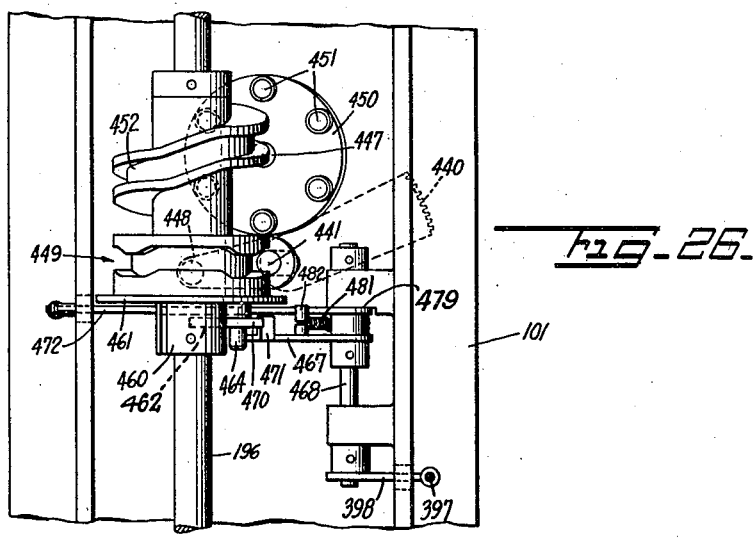
INVENTORS
HARRY R. BRAND
CHARLES A. FAUSEL
BY
H. Russell Bond
ATTORNEY

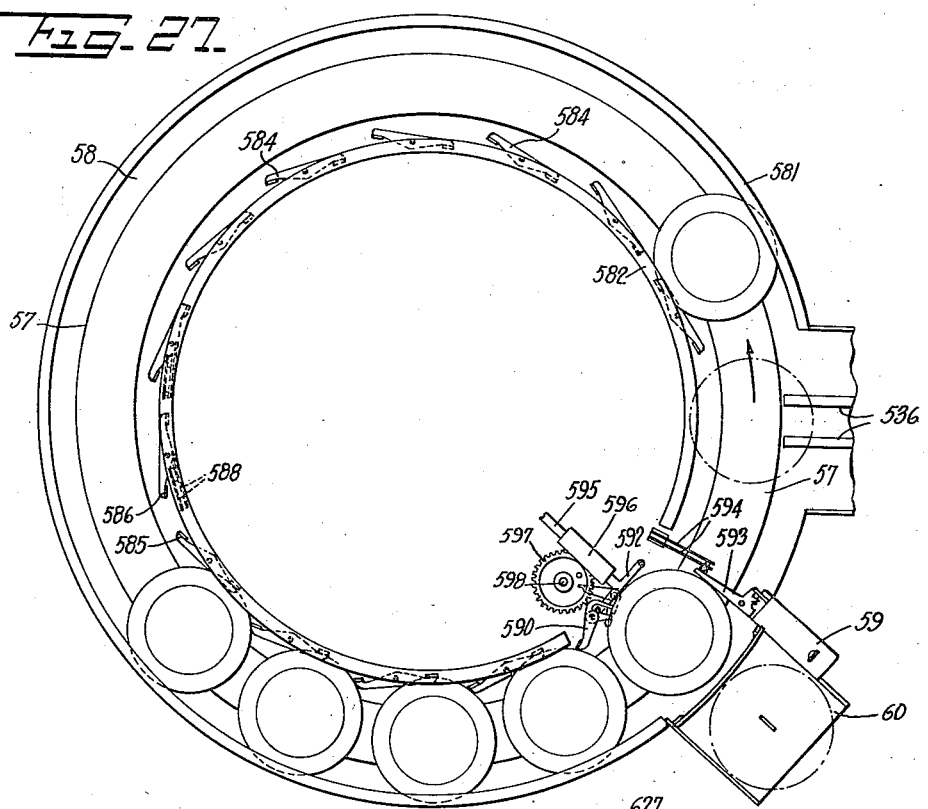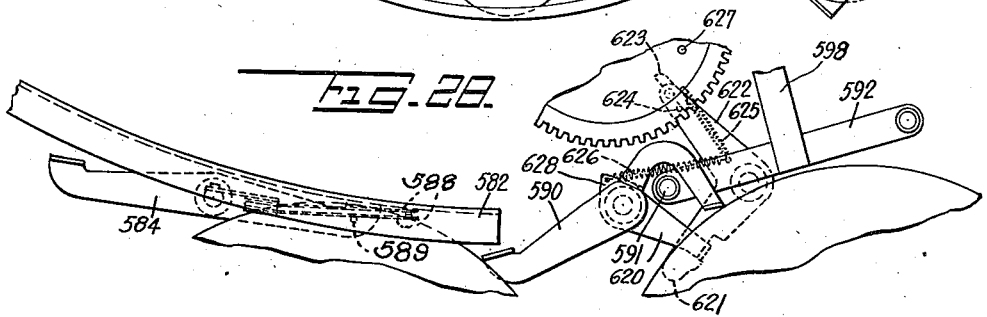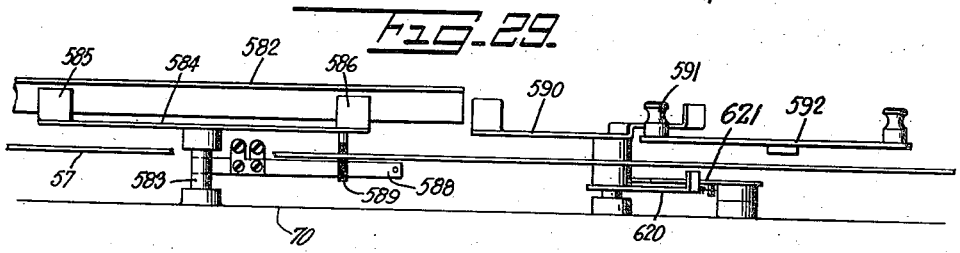

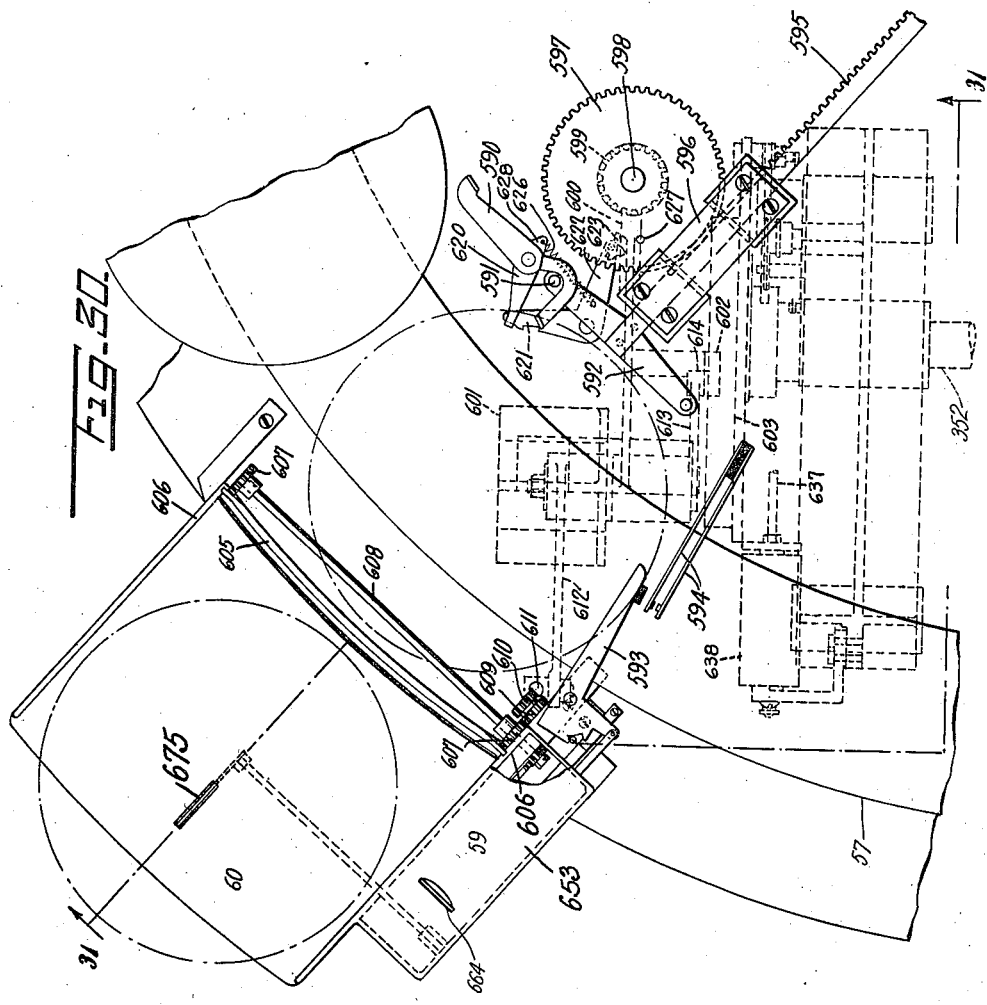

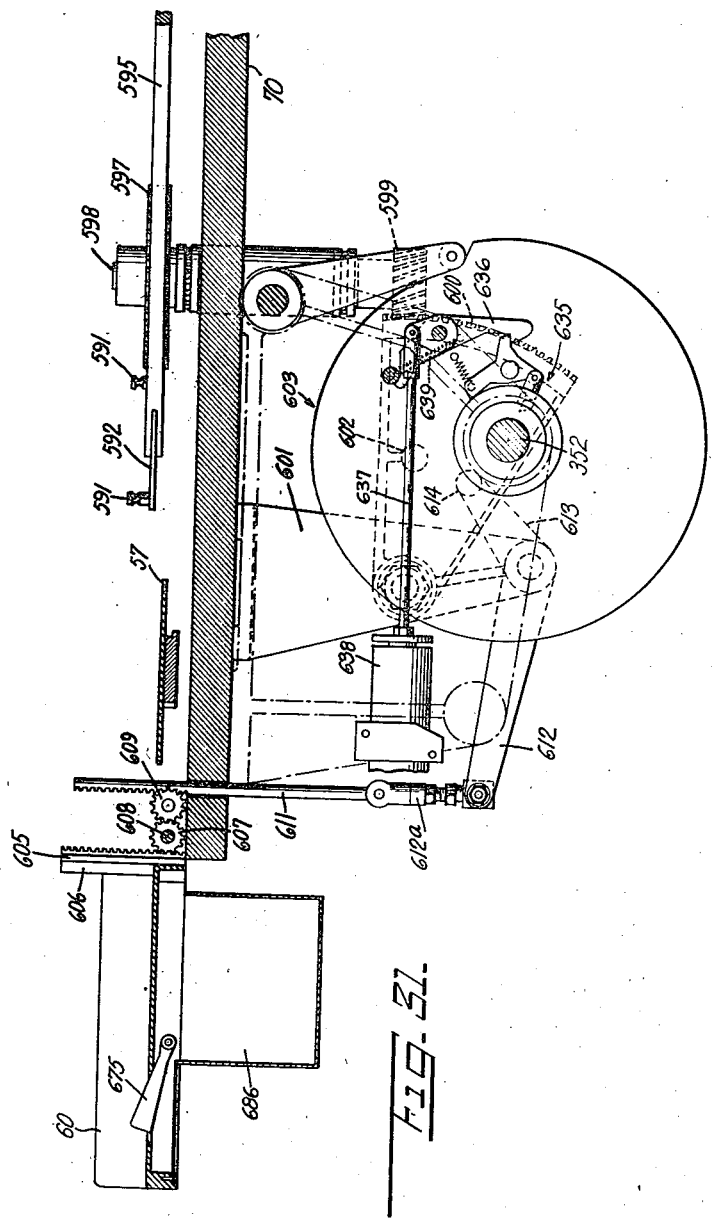

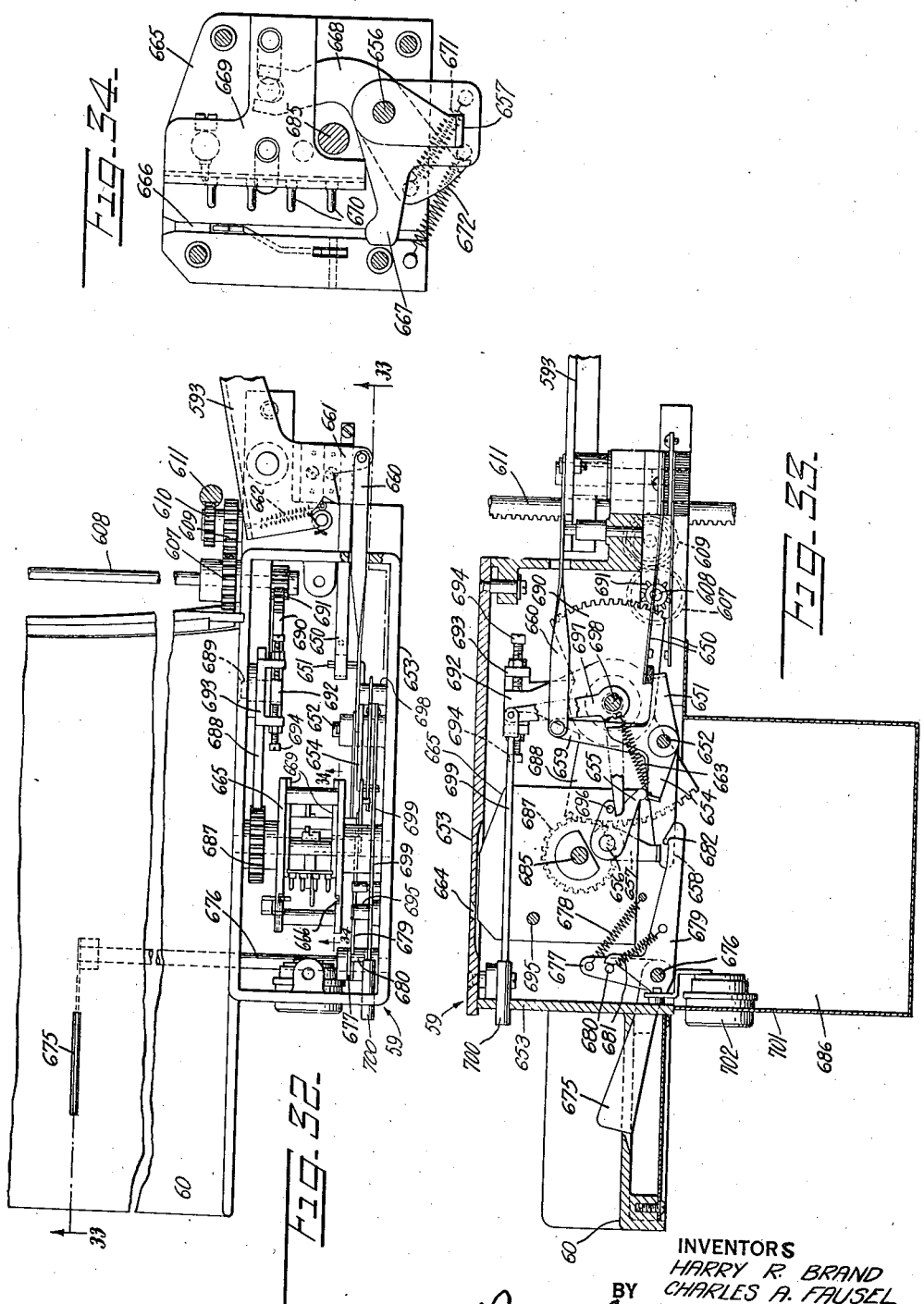

March 10, 1936.  H. R. BRAND ET AL  2,033,178
FOOD PREPARING MACHINE
Filed Nov. 28, 1932   17 Sheets-Sheet 17
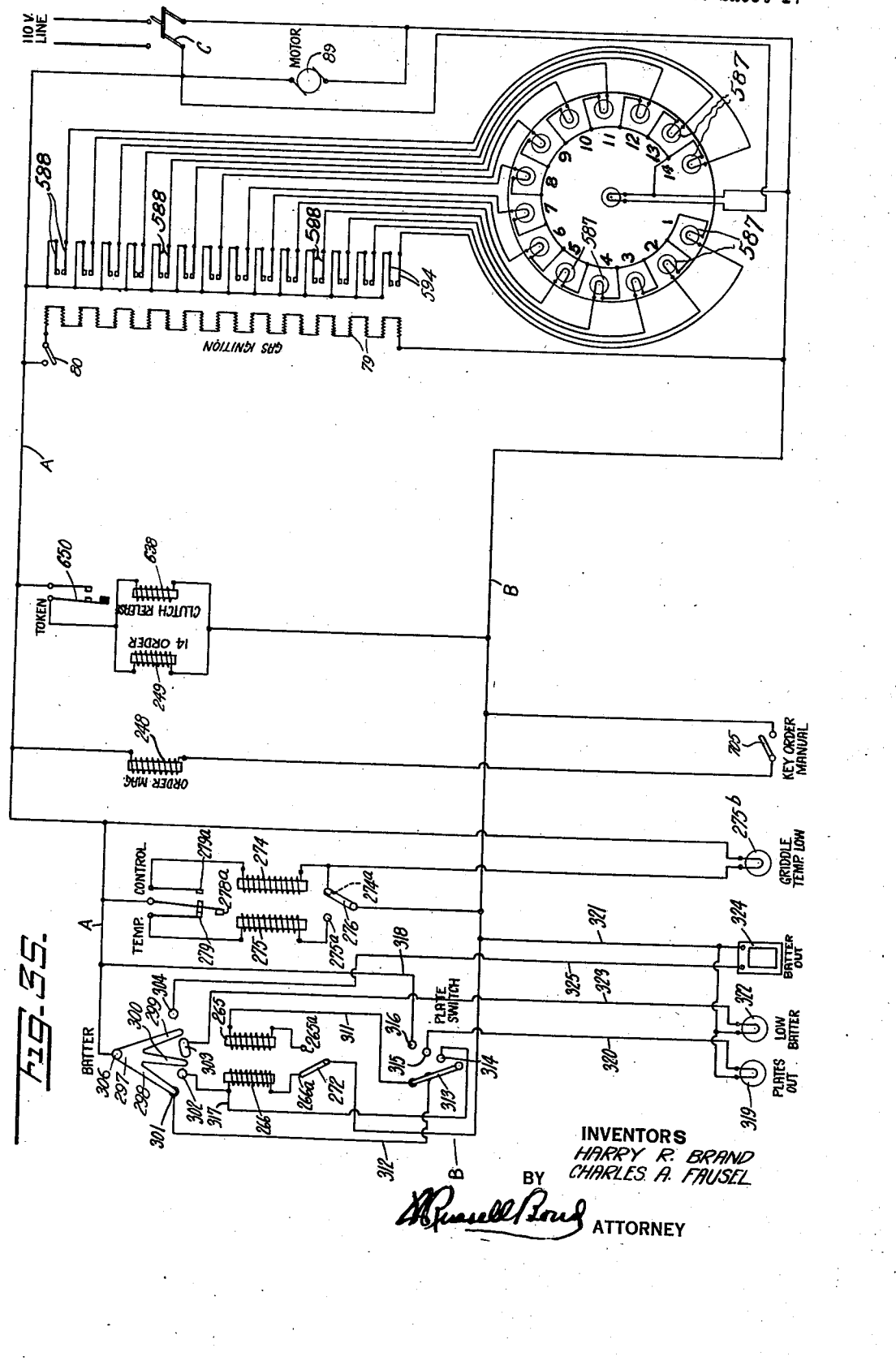
INVENTORS
HARRY R. BRAND
CHARLES A. FAUSEL
BY
J. Russell Boyd ATTORNEY Patented Mar. 10, 1936

2,033,178

UNITED STATES PATENT OFFICE 2,033,178

FOOD PREPARING MACHINE

Harry Russell Brand, New York, N. Y., and Charles A. Fausel, Glenridge, N. J.

Application November 28, 1932, Serial No. 644,736

56 Claims. (Cl. 107—4)

The present invention relates to cooking apparatus and more particularly to cooking machines embodying automatic food handling mechanism.

An object of the invention is to provide a cooking machine with mechanism for removing food therefrom after it has been subjected to a predetermined amount of cooking, such mechanism being operable only when there is food in position to be removed.

Another object is to provide mechanism for depositing food on a cooking medium and means controlled by the depositing mechanism for causing the food to be picked up from said medium after the lapse of a predetermined interval of time.

The present invention is particularly (but not exclusively) applicable to baking griddle cakes and in a specific embodiment of the invention a rotary griddle is provided with means at one point for depositing batter on the griddle and a pair of peels at two other points respectively, one to turn the half-baked cake and the other to remove the fully baked cake, said peels being normally inactive but each one operating automatically when a cake reaches it.

Another object of the invention is to provide means automatically set at each deposit of batter on the griddle, to accompany the batter and initiate the operation of the peels as said means reaches the turning and removing points respectively.

Another object is to provide mechanism controlled by the means set at each deposit of a food portion to be cooked, for bringing a dish into position to receive the food portion when it has been cooked, withdrawing the dish when a predetermined number of food portions have been deposited thereon and replacing it with another dish.

Another object of the invention is to provide a cooking machine with a storage chamber under the cooking surface of the machine, together with means for introducing therein dishes bearing food cooked on the machine, and means for conveying said dishes to a delivery point at one end of the chamber.

Another object of the invention is to provide means for indicating the number of dishes in the storage chamber and the progress of dishes therein toward the delivery point.

Another object of the invention is to provide automatic means for cleaning the cooking surface of a cooking machine.

As applied to a griddle cake baking machine our invention has for an object to provide means for removing any crumbs or spatterings of batter that might remain on the griddle as each baked cake is removed therefrom.

A further specific object of our invention is to provide a griddle cake baking machine with means for wiping the griddle, such means being operated automatically immediately after a cake has been removed from the griddle so as to clean the griddle for the next deposit of batter.

Another object of the invention is to provide means for water-cooling the batter reservoir of a griddle cake baking machine so as to insure uniformity of product despite variations of surrounding temperature.

Another object of the invention is to provide for arresting the batter pouring mechanism of a cake baking machine under various conditions, such as exhaustion of batter supply or dish supply, or reduction of griddle temperature below a predetermined minimum, or when the number of cakes poured and still in the machine reaches the limit of capacity of the storage chamber in the machine.

Further objects of the invention will appear in the following description of a preferred embodiment and thereafter the novelty and scope of the invention will be pointed out in the claims.

In the accompanying drawings;

Fig. 3A is a fragmental view in section of certain burner control mechanism;

Fig. 3B is a detail view in section of a feeler mechanism for a dish magazine of the machine;

Fig. 5A is a detail plan view of a griddle scraping mechanism;

Fig. 5B is a section taken on the line 5B—5B of Fig. 5A;

Fig. 6 is a plan view of the batter pouring and controlling mechanism with the batter magazine and pouring valve removed;

Fig. 7 is an end elevation of the same looking from the right hand side of Fig. 5;

Fig. 8 is a fragmental side elevation looking from the left hand side of Fig. 7 with a part of the mechanism broken away and in section;

Fig. 9 is a view in section taken on the line 9—9 of Fig. 8;

Fig. 10 is a view in section of the batter reservoir with an agitator removed therefrom, the section being taken on the line 10—10 of Fig. 5;

Fig. 11 is a view in section taken substantially on the line 11—11 of Fig. 10;

Figure 19:
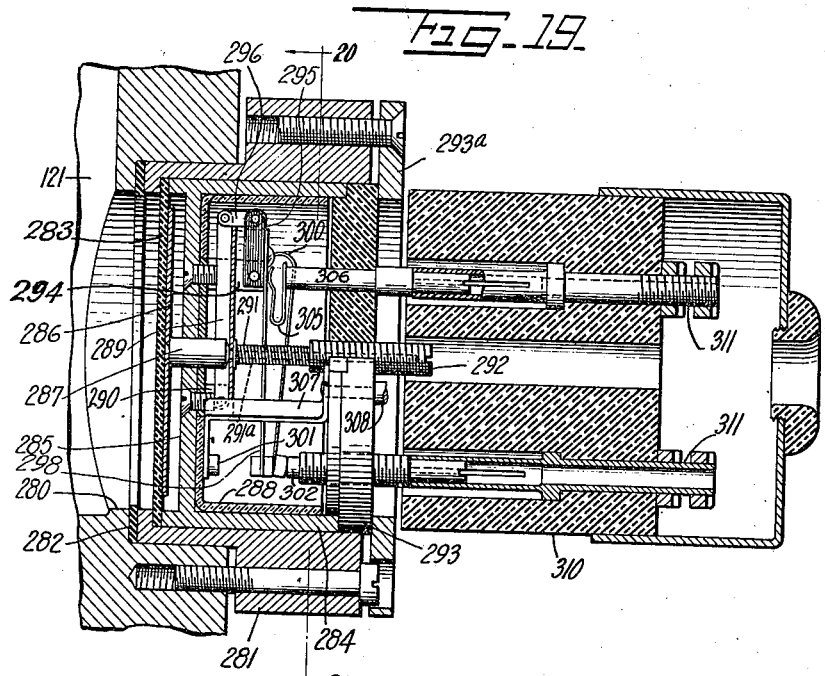
Figure 20:
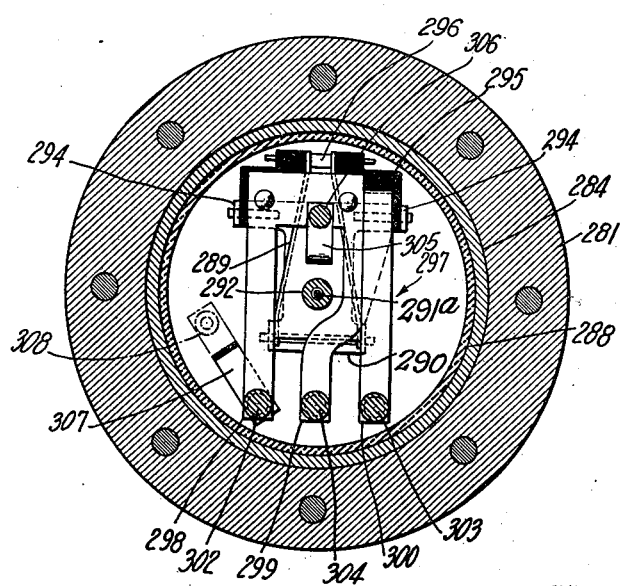
Figure 23:
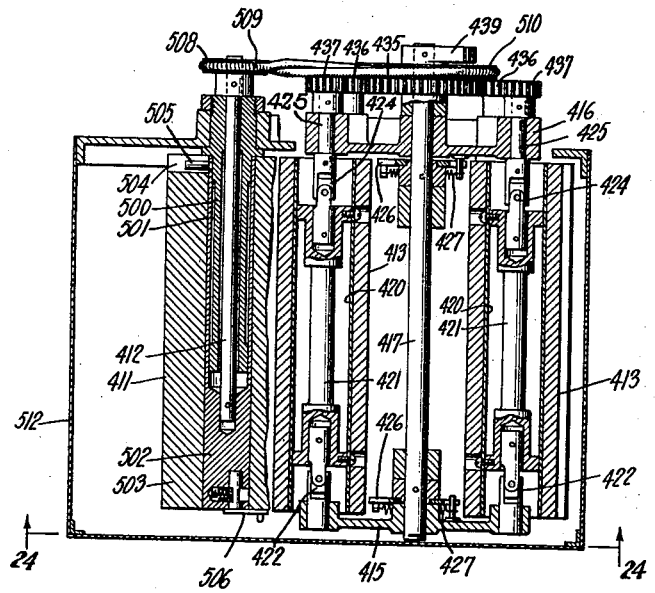
Figure 24:
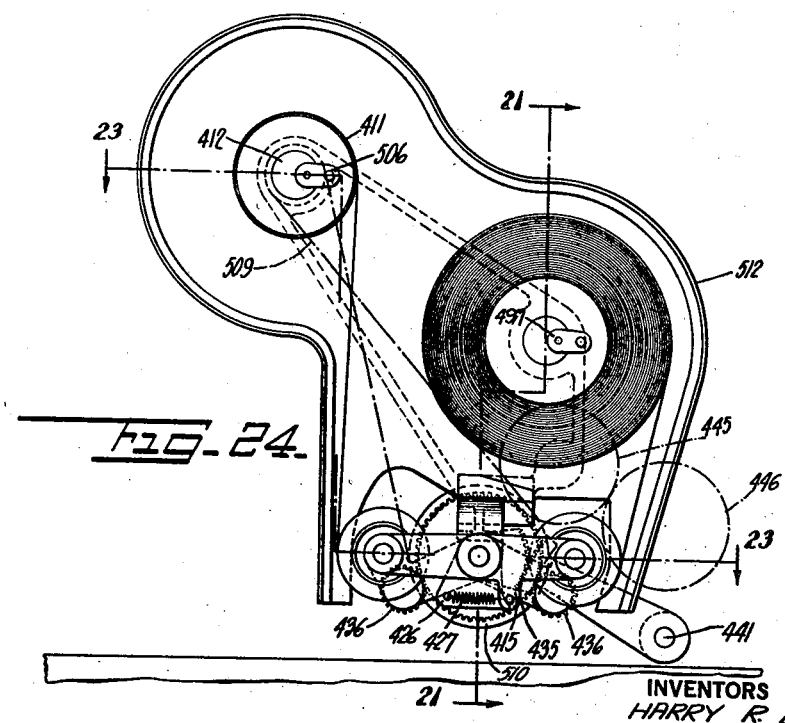

Figs. 12, 13, 14 and 15 are detail views in section taken on lines 12—12, 13—13, 14—14, and 15—15 respectively, of Fig. 11;

Fig. 16 is a detail view of mechanism for locking the batter reservoir to the pouring bracket, being a section taken on the line 16—16 of Fig. 6;

Fig. 17 is a view in cross-section taken on line 17—17 of Fig. 16;

Fig. 18 is a view in section taken on line 18—18 of Fig. 7, showing a bottom plan view of a clutch for the pouring mechanism;

Fig. 18A is a detail view of certain mechanism for initiating operation of a cake turning peel;

Fig. 18B is a detail view of means for initiating operation of a cake removing peel and certain dish handling mechanism;

Fig. 19 is a view substantially in axial section, of a hydrostatic batter gage;

Fig. 20 is a view in transverse section taken substantially on line 20—20 of Fig. 19;

Fig. 21 is a view in section of a griddle wiper showing a portion of the bracket to which said device is attached, the section being taken substantially on line 21—21 of Fig. 24;

Fig. 22 is a somewhat diagrammatic end elevation of the griddle wiper viewed from the left hand side of Fig. 21 with the supporting frame of the device omitted;

Fig. 23 is a view in section taken substantially on the irregular line 23—23 of Fig. 24;

Fig. 24 is a front elevation of the griddle wiper viewed in the direction of the arrows 24—24 of Fig. 23 and with a wall of the casing of the wiper removed;

Fig. 25 is a plan view of certain control mechanism for operating the griddle wiper;

Fig. 26 is a side elevation of the same viewed from the line 26—26 of Fig. 25;

Fig. 27 is a plan view of a storage chamber and conveyor under the griddle;

Fig. 28 is an enlarged detail view of a portion of the mechanism shown in Fig. 27;

Fig. 29 is a side elevation of the same;

Fig. 30 is a fragmental plan view of certain token controlled mechanism for delivering a dish from the storage chamber to a delivery shelf;

Fig. 31 is a view in section taken on line 31—31 of Fig. 30;

Fig. 32 is a plan view of the token control mechanism with a lid of the casing for said mechanism removed;

Fig. 33 is a view in section taken substantially on line 33—33 of Fig. 32;

Fig. 34 is a detail view taken on line 34—34 of Fig. 32; and

Fig. 35 is a diagram of electrical connections.

The cake-baking machine shown in the accompanying drawings comprises, in general, a frame on which is mounted an annular griddle 51 with means for rotating the griddle with a step-by-step motion. At one side of the machine there is a batter reservoir 52 from which portions of batter are withdrawn and poured upon the griddle by means so timed that the deposits take place during intervals between steps in the progress of the griddle.

Figure 3:
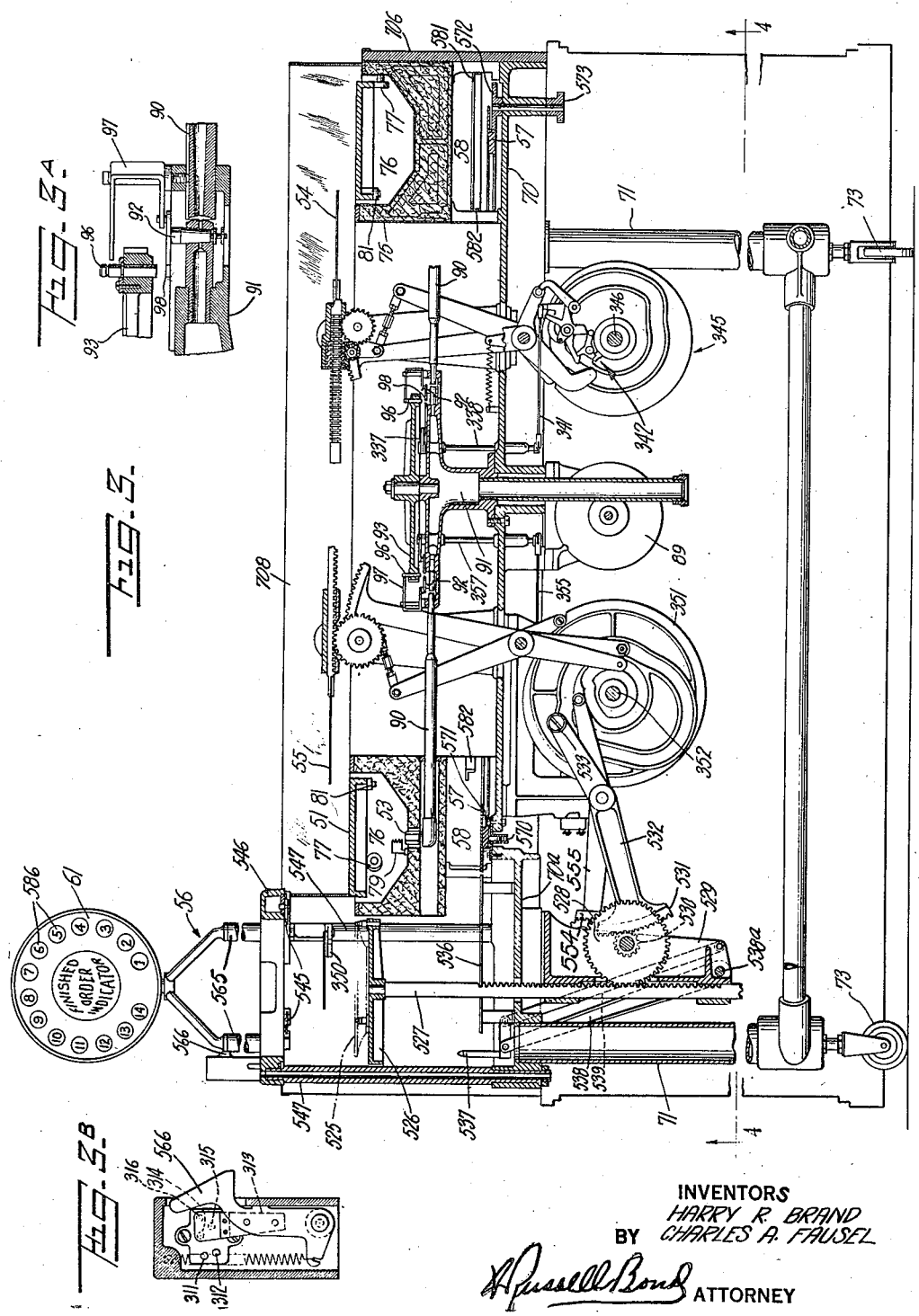
Fig. 3 is a view in section taken on the line 3—3 of Fig. 2.

Under the griddle are heating units, shown in Fig. 3 as gas burners 53, which are successively turned on so that a wave of heat will accompany each batter deposit as it is carried along upon the griddle. The parts are so proportioned and timed that each deposit of batter will have been properly baked on one side by the time it has traveled from the pouring or depositing point to a predetermined turning point. At the latter point a peel 54 picks up the cake, turns it over and drops it back upon the griddle in inverted position. Thereafter, the intermittent travel of the cake is resumed until it reaches a removing point, by which time the cake will have been properly baked on both sides. At the removing point the cake is picked up by a peel 55, carried clear of the griddle and deposited upon a dish or other suitable receptacle.

Dishes are conveniently stacked in a magazine 56 (Fig. 1) adjacent the removing point and are automatically drawn off, one at a time, from the bottom of the stack as needed, and lowered to cake-receiving position. After a predetermined number of cakes has been deposited upon a dish the latter is lowered and transferred to an annular conveyor 57 (Fig. 3) located in an annular storage chamber 58 under the griddle. In the particular machine illustrated there is space on the griddle for 21 cakes between the pouring point and the removing point, and the machine is so arranged as to furnish three cakes for each order. Consequently, seven dishes will take care of the full capacity of the griddle. However, there is space in the storage chamber for fourteen orders. The dishes are moved by the conveyor 57 toward a delivery point, where token-controlled means, indicated generally at 59 (Fig. 1) are provided for moving the order out upon a delivery shelf 60.

The pouring of the batter may be controlled from a remote station such for example as a cashier's cage, and in such case when an order is placed and paid for, the cashier transmits an ordering impulse to the machine to initiate the preparation of the order and at the same time issues a token to the customer to enable him to obtain the order as soon as it has been prepared.

Above the dish magazine is an indicator dial 61 which indicates the positions of the finished orders in the storage chamber, so that one may see whether there is an order in position to be delivered and also how many finished orders there are in the storage chamber. The order impulses sent from the cashier's cage are transmitted to an accumulator, indicated generally at 62 in Figs. 5, 8, and 9, which will store up the orders if they come in faster than the machine can prepare them. This accumulator in turn controls the operation of a pouring valve 63 by which batter is dispensed or poured from the reservoir 52 upon the griddle. Normally, the valve will operate at each step of the griddle as long as there are any orders in the accumulator waiting to be filled, but as soon as it has poured all the portions called for by the accumulator it will be stopped automatically.

Means are also provided to prevent orders started or finished, but still in the machine, from exceeding the capacity of the storage chamber. Thus, as soon as there are fourteen orders in the machine, counting those on the griddle as well as those in the storage chamber or on the way there from the griddle, the operation of the pouring valve will be automatically suspended, regardless of the accumulation of orders in the accumulator. As soon thereafter as any orders are withdrawn from the storage chamber the pouring of batter will be automatically resumed.

Between the removing peel 55 and the pouring point there is a scraping mechanism 64 for removing crumbs and spatterings of batter from the griddle and also a mechanism 65 for wiping the griddle clean.

Figure 4:
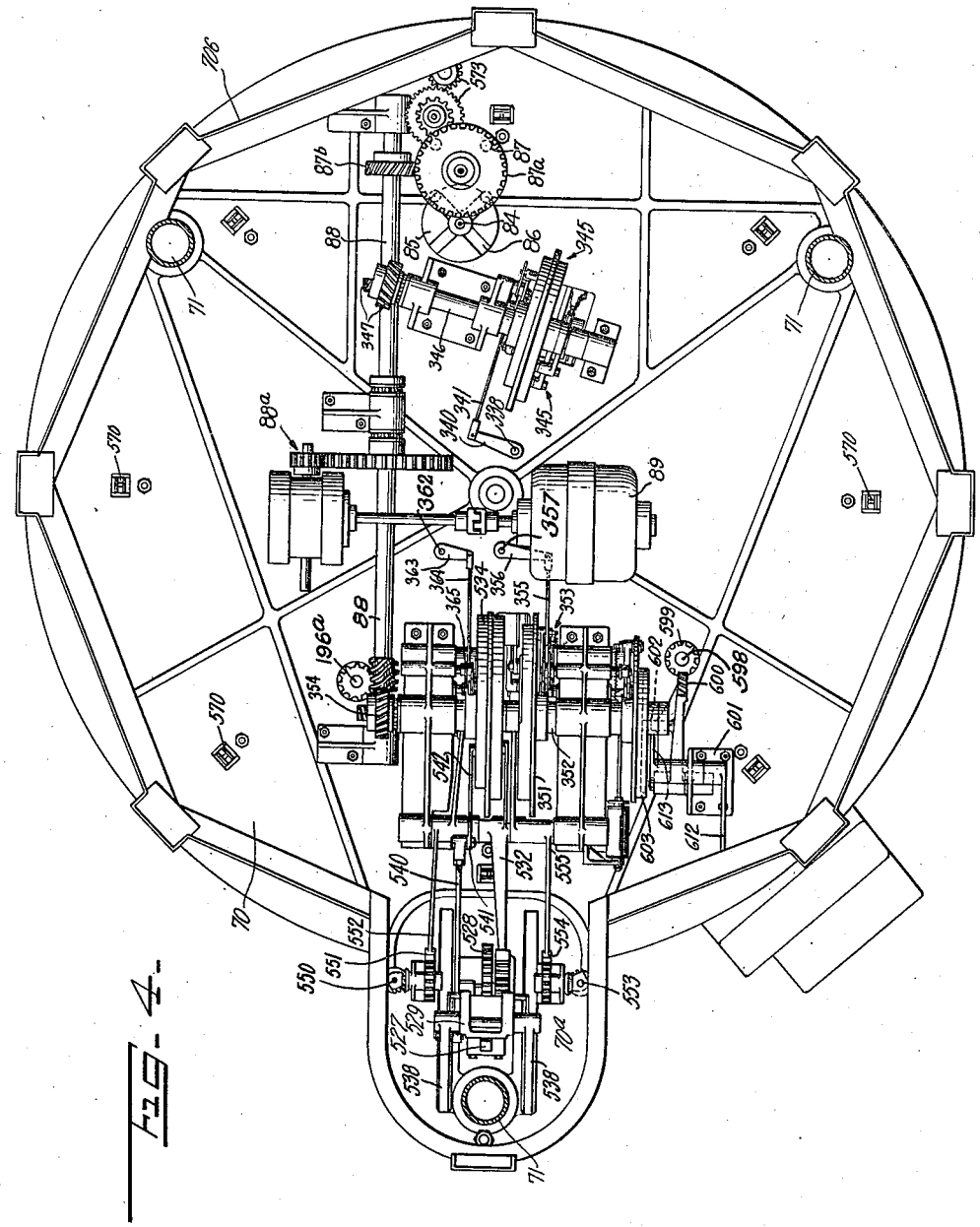
Fig. 4 is a view in section, taken on the line 4—4 of Fig. 3 and showing the under side of the machine.

With this general picture of the machine in mind, we may now proceed with a more detailed description of the same. Referring particularly to Figs. 3 and 4, it will be observed that the main frame of the machine comprises a base plate 70 supported on legs 71 provided with casters 73 so that the machine may be readily moved if so desired. Mounted on brackets rising from the base plate is an annular casing 75 filled with heat insulation material and formed in its upper face with a recess 76. In this recess is mounted the annular griddle 51 which rides on rollers 77 carried by the casing 75. The recess is thus substantially closed at the top by the griddle, forming an annular heating chamber. Projecting into the heating chamber are the gas burners 53, there being one burner for each cake position on the griddle. Adjacent each burner is a lighting filament 79 connected in series in an electric circuit shown in Fig. 35. A switch 80 in this circuit may be closed to energize the filaments and render them incandescent, whereby the burners may be simultaneously lighted when the machine is being prepared for a run of operations.

Griddle drive

The griddle is given an intermittent motion by suitable driving gear. The mechanism illustrated in the accompanying drawings consists of a species of Geneva drive. Mounted on the under side of the griddle are rollers 81 (Figs. 2 and 3) which are uniformly distributed about the griddle and located a cake spacing apart. A drive wheel 82 (Fig. 2) projects through the casing 75 and is formed with notches 83 adapted to engage the rollers 81 and thereby rotate the griddle. The size of the wheel 82 is so related to the spacing of the rollers that the griddle will be locked against movement in intervals between steps. The drive wheel is mounted on a vertical shaft 84 (Figs. 2 and 4) which passes through and has bearing in the base plate 70 and carries at its lower end a Geneva wheel 85. The latter is formed with transverse slots 86 adapted to be engaged by pins or rollers 87 on the face of a spiral gear 87a. The gear 87a is driven by a spiral pinion 87b fixed upon a drive shaft 88, and the latter is driven through a train of reduction gearing 88a by an electric motor 89 mounted on the under side of the base plate 70. This griddle drive is fully described in a copending application Serial No. 626,091, filed July 29, 1932.

Burner control by batter deposits

Figure 2:
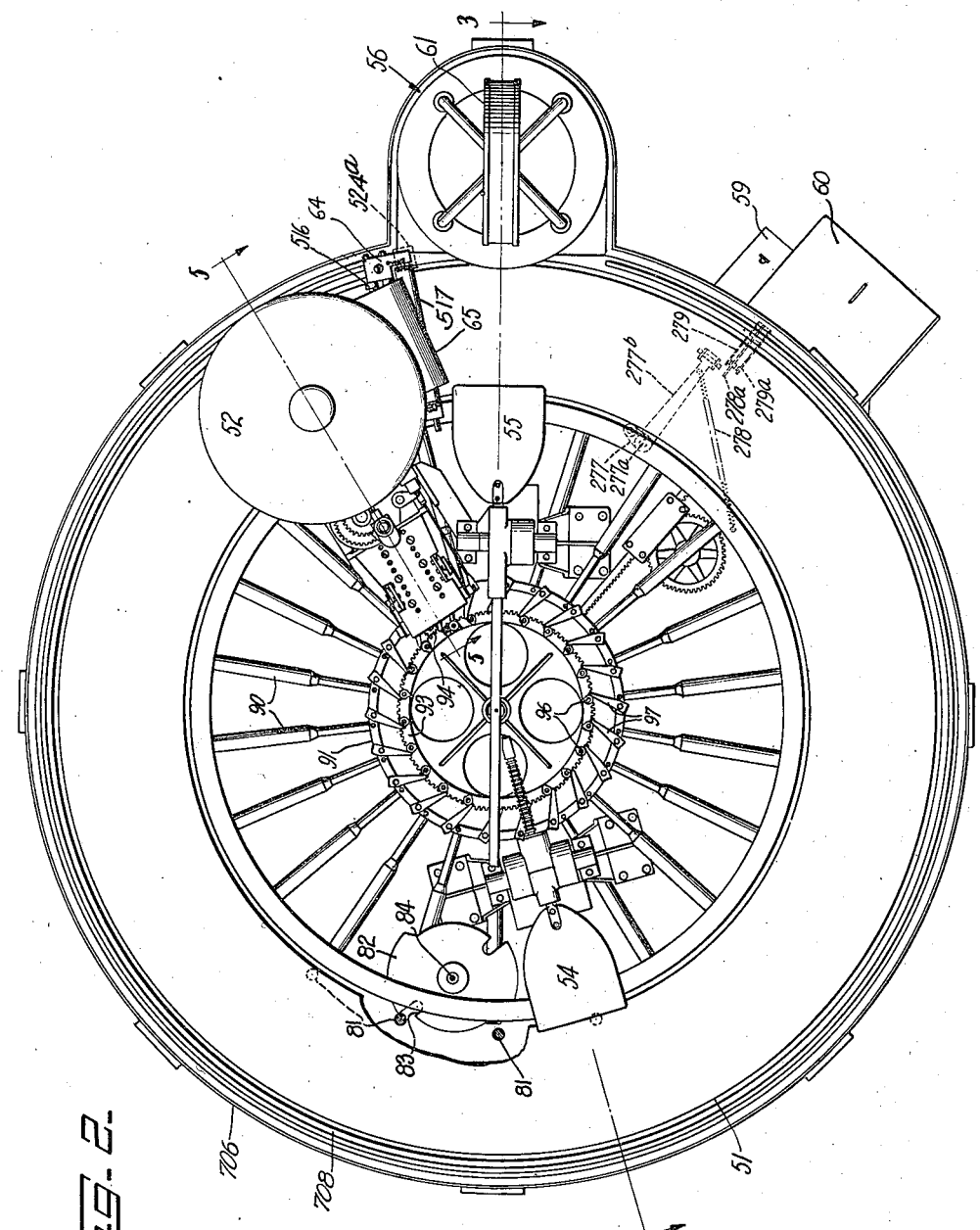
Fig. 2 is a top plan view of the machine with a portion of the casing removed.

The burners 53, Figs. 2 and 3, are fed through pipes 90 which radiate from a common header 91. Each of the pipes 90 is provided with a valve 92. A valve control wheel 93 is centrally located with respect to the header and is mounted to rotate thereon. This valve wheel is driven by a pinion 94 fixed on a shaft 95 (Fig. 5) suitably connected to a series of power. The wheel rotates at the average speed of rotation of the griddle 51 but its rotation is continuous instead of being intermittent. Vertically slidable in the wheel 93 are pins 96 (see also Figs. 3A and 25) which act on arms 97 to throttle or partly close the valves 92 and on arms 98 to open said valves. The arms 97 lie above the wheel 93 and are adapted to be engaged by the pins 96 when the latter are raised, while the arms 98 lie below the wheel 93 and are adapted to be engaged by the pins 96 when the latter are depressed. However, the arms 97 and 98 are so interconnected that when one is swung outward by engagement with a pin 96 the other will be swung inward and vice versa.

Normally the arms are in the position shown in Fig. 25 and the valves 92 are throttled. The pins 96 being normally in raised position, clear the ends of arms 97 and pass over the arms 98. Means are provided to depress a pin 96 whenever a portion of batter is poured on the griddle, as will be described more fully hereinafter. The depressed pin will then strike the arms 98 one after another as it pursues its orbit, successively opening the valves 92 to supply additional heat to the burners. But as each arm 98 swings outward its companion arm 97 will be swung inward. The next pin 96 that is in normal position will then strike the arms 97 and restore the valves to normal throttled position. Thus, a wave of heat accompanies each cake as it proceeds from the pouring point to the removing point. At the latter point, a cam, 99 (Fig. 5) returns each depressed pin to raised position.

The mechanism for controlling the burners is fully described in a copending application Serial No. 626,090, filed July 29, 1932.

Batter reservoir and mounting

Figure 5:
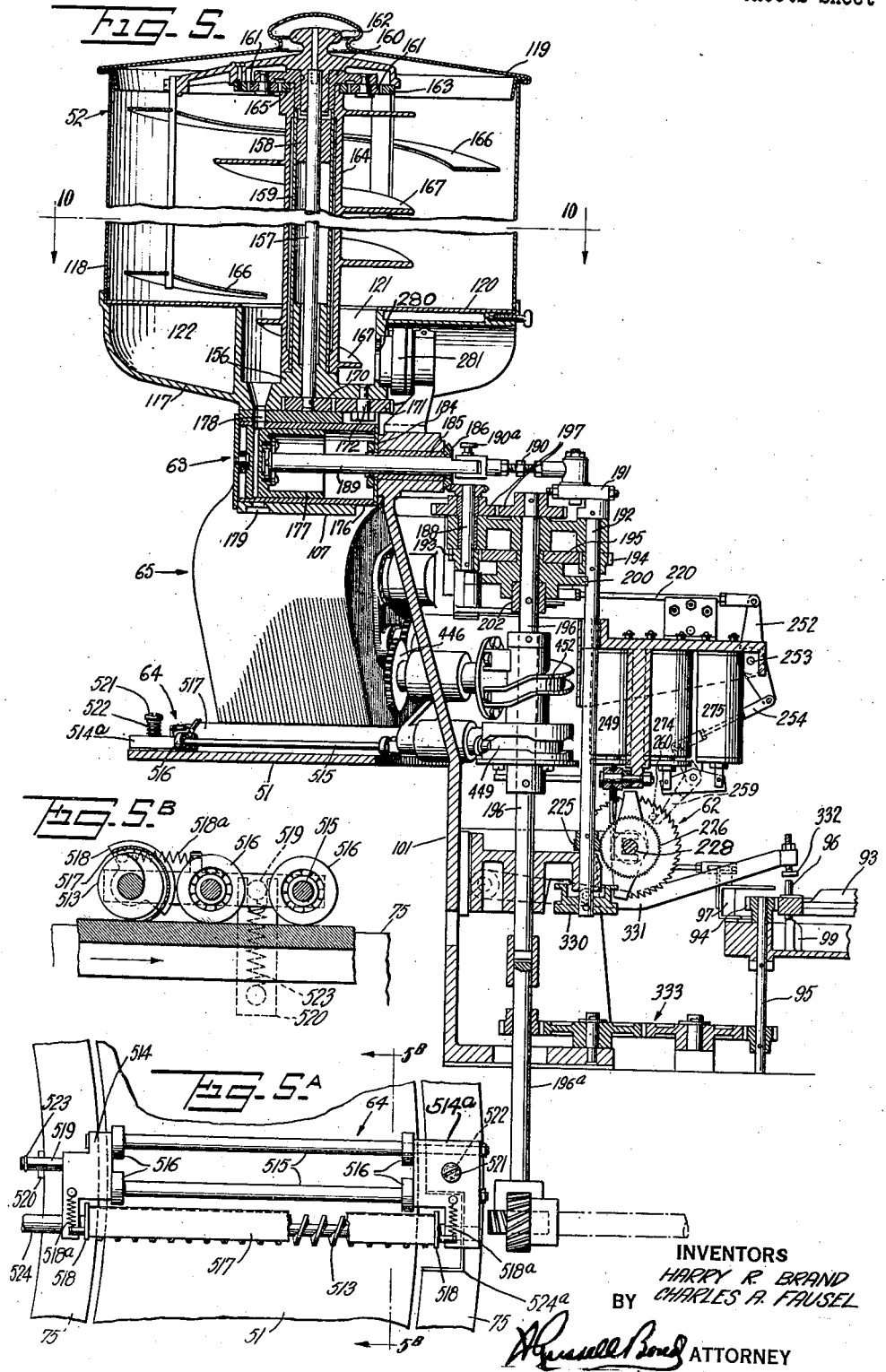
Fig. 5 is a view in section of certain batter pouring and controlling mechanism, the section being taken on the line 5—5 of Fig. 2.

Referring now more particularly to Figs. 5, 6, and 7, a bracket 101 is provided at one side of the machine, which bracket at its upper end carries a pair of supports 102 and 103 projecting horizontally over the griddle. These supports are adapted to carry the batter reservoir 52. The base of the batter reservoir, as shown in Figs. 10 and 11, has fixed thereto a casting 104 formed with a pair of hubs 105 and 106 which are adapted to fit on the supports 102 and 103 respectively. The casting is also formed with a tubular part 107 between the hubs (see Fig. 5) which serves as a casing for the batter pouring valve 63.

The batter reservoir is adapted to be locked upon the machine by means of a latch, best shown in Figs. 16 and 17. The latch mechanism is mounted in the support 102 which is tubular and in the outer end of which is fitted a lock 108. A latch 109 on the barrel of the lock projects, when in locking position, through a slot 110 in the tubular support 102 and rests in a recess near the outer end of the hub 105. The lock barrel is eccentrically disposed with respect to the tubular support so that when it is turned by means of a key 111, the latch will be swung within the tubular support clear of the hub, permitting removal of the reservoir.

Mounted in the support 102 and in substantial alignment with the lock barrel, is a shaft 112 which, at its outer end, is formed with a slot adapted to receive the latch 109. Thus, when the lock is turned the shaft 112 will also be turned. The latter is prevented from axial movement by a set screw 113 engaging a groove 114 in the shaft.

The end of the shaft away from the lock projects from the tubular support 102 and has fitted thereon a collar 115 which is formed with an annular cam face 116. The purpose of this cam, as will be explained more fully hereinafter, is to operate certain stop mechanism which will prevent the pouring of batter on the griddle when the batter reservoir is not in place and locked fast to the bracket.

The batter reservoir comprises, a bowl-shaped lower part 117 (Figs. 5 and 11) fixed to the base casting 104 and supporting a hollow cylinder 118 provided with a detachable lid or cover 119. The cylinder is secured to the bowl 117 and is formed with a floor or bottom wall 120 which is centrally apertured to register with a cup or well 121 formed in the bowl. The space 122 in the bowl surrounding the cup 121 constitutes a cooling chamber through which water may be circulated.

Batter reservoir cooling system

The water enters the cooling chamber through an inlet duct 123, Figs. 10 and 11. A radial partition 124 in the cooling chamber insures circulation around the well 121 and prevents the water from taking a short cut from the inlet duct 123 directly to an outlet duct 125. The mouth of the duct 125 is so close to the wall 120 that the chamber 122 must be filled with water and the water, being under pressure, must contact with the wall 120 before it can overflow into said outlet duct, thus cooling the bottom of the cylinder 118 as well as the contents of the well 121.

The ducts 123 and 125 lead respectively out of and into the hub 106, and when the reservoir is in locked position, they register with inlet and outlet ports 126 and 127 respectively, formed in the support 103. As best shown in Figs. 11 to 15 inclusive, the support 103 is formed with a central bore 128 through which water is led to the port 126 and duct 123 and with a lower bore 129 through which water may pass out from the duct 125 and port 127. The central bore 128 is connected through a valve 130 to an intake pipe 131. The valve is of the three-way type so that when turned to close the intake pipe it opens communication through a drain pipe 132 to an overflow pipe 133 connected with the lower bore 129.

Since the batter reservoir is removable from the supports 102 and 103, it is necessary to provide a water-tight fit between the ducts 123 and 125 and the ports 126 and 127 respectively. To this end each port is formed in a tubular rubber gasket 134 fitted into a metallic thimble 135 which is fitted in the support 103. The bore 128 intersects the port 126 below its thimble and continues to the outer end of the support 103. A shaft 137 fitted in the bore 128 is provided with eccentric portions 138 which bear against the thimbles so that when the shaft is turned the thimbles will be raised and the gaskets will be pressed tightly against the inner face of the hub 106, effecting a water-tight seal. The inner end of the shaft 137 is fluted, as indicated at 139 in Fig. 15, so as not to interrupt circulation of water through the bore 128 to the port 126. Leakage between the ports 126 and 127 is prevented by a grease packing in an annular groove 140 formed in the shaft 137. A similar packing is provided in an outer annular groove 141 formed in the shaft 137 to prevent leakage from port 127 past the outer end of said shaft. Grease is fed to these grooves from a grease cup 142 through a grease passage 143 formed in the support 103.

Before removing the reservoir from its supports, it is necessary to drain out the cooling chamber 122. To this end, the valve 130 is turned to cut off the intake pipe 131 and the water then drains out of the chamber 122 back through the inlet duct 123, bore 128 and pipe 132 to the pipe 133. A needle valve 146 in the chamber 122 may be turned to admit air and expedite the draining. The water chamber is interrupted by a U-shaped partition 147 within which certain control mechanism (to be described hereinafter) is located, and since the water cannot drain over this partition a port 149 (Fig. 10) is provided in the wall 124. However, this port is so small that it does not interfere with the normal circulation of the water through the chamber 122. In other words, most of the water entering the chamber through the duct 123 will pass around the chamber 122 over the partition 147 and thence will drain out through the duct 125 and only a very small portion thereof will pass through the port 148. After the water has been drained out the shaft 137 is turned to release pressure on the rubber gaskets 134 and then upon unlocking the batter reservoir the latter may be withdrawn from its supports.

When the reservoir is replaced upon its supports, the shaft 137 is again turned to force the gaskets tightly against the hub 106, and thereafter the valve 130 is turned to cut off the pipe 132 and to connect the cooling chamber with the pipe 131. At the outer end of the support 103 the bore 128 is enlarged to receive a bushing 150 through which a key or screw driver may be introduced to engage the end of the shaft 137 and turn the same.

Batter agitator

In order to prevent gravitational separation of the ingredients in the reservoir and insure a uniform batter mixture, an agitator is provided in the reservoir. This agitator may be of any suitable type, but we prefer to use an agitator of the kind shown in Fig. 5, and which will now be described.

Rising from the floor of the well 121 (Fig. 5) is a bearing 156 for a vertical shaft 157. An upper bearing 158 for said shaft is supported by a sleeve 159 fixed to and rising from the bearing 156. Secured to the upper end of this sleeve is a head 160 formed with a pair of arms on each of which a spur pinion 161 is mounted. A cap 162 secured to the upper end of the shaft 157, carries an internal gear 163 which meshes with the pinions 161. Mounted to turn on the sleeve 159 and head 160 is a tubular shaft or hub 164 which is fitted with a gear 165 engaging the pinions 161. Thus, a planetary gearing is provided whereby when the shaft 157 is turned, the cap 162 will rotate with it and the hub 164 will be rotated at a higher velocity in the opposite direction.

Depending from the cap 162 is a spiral blade 166 which reaches to the floor wall 120. On the hub 164 is formed a conical spiral blade 167 which reaches to the bottom of the well 121. The shaft 157 is turned in such direction as to draw material upward at the center of the reservoir. This prevents settling and insures a homogeneous mixture and at the same time it maintains desirable temperature conditions determined by the cooling water in the chamber 122.

At the lower end of the shaft 157 is a pinion 170 fixed thereon which meshes with a pinion 171 mounted on a stud 172 carried by the bowl 117 of the reservoir. The pinion 171 is in such position as to mesh with a pinion 173 (Fig. 6) mounted on the bracket 101, when the reservoir is properly positioned on the supports 102 and 103.

Batter pouring valve

Fitted in the valve casing 107 (Fig. 5) is a cylindrical measuring valve comprising a valve cylinder 176 mounted to rotate and a plunger 177 mounted to reciprocate in the cylinder. The valve casing is formed with an intake port 178 which opens from the well 121 and also with an outlet port 179 which leads out of the casing opposite the intake port. The cylinder 176 has an elongated port on one side which communicates with the ports 178 and 179 alternately, as said cylinder is rotated. The plunger is reciprocated in timed relation to the rotation of the cylinder, so that it will move outward to draw batter from the reservoir when the cylinder is in communication with the intake port 178 and will move inward to positively eject the batter from the cylinder when the latter is turned to communicate with the port 179.

The cylinder and plunger are removable with the reservoir and hence detachable means must be provided for operating these valve parts. Thus, the cylinder 176 is notched at its outer end to engage a spider 184 fixed upon a tubular shaft 185 mounted in the bracket 101. The shaft 185 is driven through a pair of miter pinions 186 by a vertical shaft 188. The plunger 177 is provided with a stem 189 which passes through the tubular shaft 185 and is connected by a link 190 to a crank 191 secured to a vertical shaft 192. A thumb screw 190a permits of detaching the stem 189 from the link 190 whenever it is desired to withdraw the reservoir from its supports.

The shafts 188 and 192 are driven by pinions 193 and 194 respectively which mesh with a driving gear 195 journaled on a drive shaft 196. There is a three-to-one gear ratio between pinions 193 and 194 and the driving gear 195. The latter, as will be explained hereinafter, is connected to the shaft 196 by a clutch and is given one complete rotation for each order of cakes, but the pinions 193 and 194 make three rotations, thereby operating the batter pouring valve to pour three cakes for each order. The agitator in the batter reservoir, on the other hand, is continuously driven through a train of gearing 197 (Fig. 6) connecting shaft 196 and a shaft 198 on which the pinion 173 is fixed.

Pouring valve clutch

The clutch above referred to which connects the driving gear 195 to the shaft 196, is more clearly shown in Fig. 18. This clutch comprises a cam disk 200 to which the gear 195 is secured. The hub 201 of the cam 200 is recessed to receive a driving collar 202 fixed upon the shaft 196. This driving collar is formed with notches 203 (preferably three notches disposed 120 degrees apart) to engage a clutch pin 204 radially slidable in the hub 201. A three-armed clutch lever 205 is pivotally mounted on the face of the cam 200 and the pin 204 is carried by one of the arms of this lever, being urged into engagement with the collar 202 by a spring 206. To disengage the clutch, a latch lever 207 is provided which is adapted to operatively engage a second one of the arms of the lever 205 and draw the pin out of engagement with the collar 202. The drawings, Fig. 18, show the pouring control clutch in disengaged position with the third arm of the lever 205 engaging the hub 201 and serving to limit the extent to which the pin 204 is withdrawn.

The latch 207 is fixed upon a vertical shaft 208. To the upper end of this shaft is fixed a crank 209 (see Figs. 6, 7, and 16). A pin 210 on this crank is adapted to engage the cam face 116 on the rod 112 which passes through the support 102. The cam face 116 is so disposed that the latch cannot be released unless the reservoir is locked in place. This prevents engagement of the clutch and operation of the batter pouring valve unless the reservoir has been properly secured to the bracket 101.

Journaled on an extension of the bracket 101 is a bell crank 211 (Fig. 18) one arm of which carries a roller 212 while the other arm carries a roller 213. The roller 212 is pressed against the periphery of the cam 200 by a spring 214. The cam 200 is of such shape that when the clutch is engaged, the roller 212 will be forced outwardly until the cam 200 has made one complete rotation, when the roller 212 will drop off a shoulder 215 formed on the periphery of the cam. In dropping off this shoulder, the cam will be given a forward thrust which will carry the pin 204 clear of the driving faces of the notches in the collar 202 and permit of withdrawing the pin from engagement with said collar without binding. However, this means of releasing the clutch pin comes into play only when the clutch is to be disengaged and it is not desirable to have the cam 200 override the shaft 196 at each rotation, since this would produce a jerky motion and prevent smooth operation of the mechanism. Means are therefore provided for holding the roller 212 clear of the cam after it has been forced outward until such time as the latch 207 is thrown into position to engage the lever 205 and disengage the clutch. These means will now be described:

Journaled on the shaft 208 is a lever 216 which is normally pressed into engagement with the roller 213 by a spring 217 connecting said lever to the latch lever 207. When the clutch is engaged and the bell-crank 211 is swung counterclockwise, as viewed in Fig. 18, by the cam 200, the roller 213 is swung clear of the lever 216 and the latter, under the urge of spring 217, snaps past the roller 213 and is brought to a stop against a pin 218 carried by the latch lever 207. A spring 219 urges the latch lever 207 to unlatched position and a connecting rod 220 connected to the latch lever 207 limits the extent to which the lever 207 may be pulled by the spring 219. As long as the lever 207 is in unlatched position after the arm 216 is snapped over the roller 213, the bell crank 211 cannot swing inward, but will remain in inoperative position with the roller 213 bearing against the end of the arm 216. The clutch will then remain engaged without any intermittent speeding of cam 200 by the roller 212.

To disengage the clutch, the rod 220 is pulled, thereby bringing the latch 207 into position to engage the lever 205 as soon as the cam has completed its next rotation, and in drawing the latch 207 to such latching position, the pin 218 will withdraw the arm 216 from the path of the roller 213, so that the roller 212 will now be free to engage the cam 200 and, when the cam approaches closely to the position shown in Fig. 18, to drop off the shoulder 215, causing the cam to override the shaft 196 and free the pin 204 so that it may readily be disengaged.

Order accumulator

On the shaft 192 (Figs. 5 and 8) near the lower end thereof, a worm 225 is fixed to mesh with a worm wheel 226. As shown in Fig. 9, the worm wheel is carried by a sleeve shaft 227 which rotates upon a fixed shaft 228 secured to stationary supports 229 (Figs. 7 and 8) projecting from the bracket 101. Journaled on the fixed shaft 228 at opposite ends of the sleeve 227 are two ratchet wheels 230 and 231 respectively. A spiral spring 232 is fixed at one end to the hub of the ratchet wheel 230, while the opposite end of the spring is secured to a spring drum or casing 233 fixed to the shaft 228. Similarly a spiral spring 234 is connected at one end to the ratchet wheel 231 and at the other end to a casing or spring drum 235 fixed to the shaft 228. A two-armed escapement pawl 236 (see also Fig. 9) is adapted to engage the ratchet 230 and a similar escapement 237 is adapted to engage the ratchet wheel 231. These escapement pawls are of such form that when reciprocated axially they will permit the ratchet wheels to move in counterclockwise direction, as viewed in Fig. 8, with respect to the tubular shaft 227.

The escapement pawls 236 and 237 are formed with hubs 238 and 239 respectively which are splined upon the tubular shaft 227. Each hub is formed with an annular groove and these grooves are engaged by pins 242 and 243 respectively which are carried by arms 244 and 245. The arms 244 and 245 are pivoted upon a fixed stud 246 (Fig. 9) and are connected by a spring 247 which urges the escapement hubs against the worm wheel 226.

The arm 244 is provided with a lateral extension which is connected to the plunger of a solenoid 248 (Fig. 6), while the arm 245 has an oppositely disposed extension which is similarly connected to the plunger of a solenoid 249. When either of these solenoids is energized it will operate the escapement connected therewith to release the ratchet wheel controlled thereby, permitting it to move backward or counterclockwise, as viewed in Fig. 8, with respect to the worm wheel 226.

The arrangement of the mechanism so far described is such that the clutch will remain engaged and the batter pouring will continue until there is a pull on the rod 220. Automatic means, however, are provided for disengaging the clutch as soon as the orders that have been transmitted to the machine have been filled. Each order impulse transmitted to the machine energizes the solenoid 248 to set the ratchet wheel 230 backward one notch; also, as each order is filled and withdrawn from the machine, the solenoid 249 is energized (by means hereinafter described) to set the ratchet wheel 231 backward one tooth spacing for each withdrawal.

As shown in Fig. 8, the connecting rod 220 is pivotally secured at its outer end to one arm of a lever 252 fixed upon a shaft 253. The other arm of the lever is connected by a link 254 to a crank 255 fixed upon a shaft 256. A depending arm 257, secured to the shaft 256 is adapted to engage a pin 258 projecting from the face of the escapement wheel 230. Also fixed upon the shaft 256 is another depending arm 259 (Fig. 7) which normally lies in position to engage a pin 260 projecting from the face of the ratchet wheel 231. When the machine is at rest the pin 258 will bear against the arm 257, thereby holding the latch 207 in engagement with the latch lever 205, the pin 204 being thus held disengaged from the notched driving counter 202. If, now an order impulse is transmitted to the machine, the solenoid 248 is energized, causing the ratchet wheel 230 to move counterclockwise through a spacing of one tooth and thereby withdrawing the pin 258 from the arm 257. When this occurs, the spring 219 (Fig. 18) will operate to withdraw the latch 207, permitting the clutch pin 204 to engage the collar 202 and thereby setting the gear 195 in motion. If, in the meantime, no further orders are received the gear 195 will make one complete rotation causing the pinions 193 and 194 to make three full rotations to pour three portions of batter upon the griddle 51, at the end of which time the worm gearing 225—226 will have moved the pin 258 back into engagement with the arm 257, pulling the rod 220 and disengaging the clutch. Since, however, the orders may be received much faster than they can be filled, the pin 258 may be set back any number of tooth spaces from the arm 257, and the pouring of batter at each step of the intermittent rotation of the griddle will continue until all the orders have been filled, by which time the pin 258 will have been brought back into position to stop the pouring.

As previously stated, in the particular embodiment illustrated, there is space for only fourteen orders in the storage chamber. The ratchet wheel 231 is employed to stop the machine whenever the orders poured exceed the orders withdrawn by fourteen. To this end, the pin 260 carried by the ratchet wheel 231 is initially located 14 tooth spaces away from the arm 259. Since the escapement pawls while in normal position fix the ratchet wheels to the shaft 227, said wheels normally turn clockwise with the worm wheel 226, and the pin 260 will be progressed toward the arm 259 as each order is poured and will eventually strike said arm, as shown in Fig. 5, unless in the meantime it is set back by the withdrawal of an order from the machine. As stated above, the solenoid 249 is energized every time an order is withdrawn from the machine and this sets back the ratchet wheel 231 and hence the pin 260. If, at any time, however, there are fourteen more poured orders than withdrawals the pin 260 will strike the arm 259 and disengage the clutch. The pouring of batter will then be stopped until some of the orders have been withdrawn from the machine. This, however, will not prevent further orders from being transmitted to the machine and accumulated on the ratchet wheel 230.

Means are also provided for stopping the pouring when the temperature of the griddle varies from a predetermined degree and also when the supply of batter in the reservoir falls below a predetermined amount or the supply of dishes or plates to receive the orders nears depletion.

Adjacent the solenoid 248 are two solenoids 265 and 266. By means which will be described hereinafter the solenoid 266 is energized whenever the supply of batter is practically exhausted or the supply of plates in the plate magazine falls below a predetermined minimum, while the solenoid 265 is energized whenever the batter supply is replenished or the number of plates is raised above said minimum.

The plungers of solenoids 265 and 266 (Fig. 8) are connected to a cross-head 267 mounted to oscillate on the shaft 256. Fixed to move with the cross-head is an upwardly extending arm 268 which carries a roller 269. When the solenoid 266 is energized, the arm 268 is swung toward the left, as shown in Fig. 8, and the roller 269 bearing against the curved end portion of an arm 270 lifts said arm. The latter is fixed to the shaft 253 so that when the arm is lifted the rod 220 is pulled, disengaging the clutch and thereby stopping batter pouring regardless of the positions of the pins 258 and 260.

It will be understood that the clutch will not be disengaged until it has completed a rotation; also that the arm 270 is raised every time that the rod 220 is pulled, whether it be by the pin 258 or the pin 260. If the solenoid 266 is energized while the arm 270 is raised, the roller merely passes under the end of the arm and serves to prevent the arm from dropping when later the pin 258 or the pin 260, as the case may be, are withdrawn from arms 257 and 259 respectively. When the solenoid 265 is energized, the arm 268 is swung toward the right withdrawing the roller 269 and permitting the arm 270 to drop and pouring to be resumed unless otherwise restrained.

In order to deenergize each solenoid immediately after it has functioned, a snap switch 272 is provided cooperatively positioned relative to contacts 265a and 266a respectively in the circuits of the solenoids 265 and 266. The upper end of the arm 268 is connected by a spring 271 to the switch lever 272 in such manner that as the arm 268 is swung past the fulcrum of the switch lever the latter will be snapped from one position to another. The snap switch is connected in series with certain other switches to be described hereinafter. In Fig. 8 the solenoid 266 is represented as having tilted the arm 268 toward the left, with the result that the snap switch has disconnected solenoid 266 from power and has made a connection to solenoid 265 which will be completed when one of said other switches is closed. However, immediately after the latter solenoid is energized the snap switch will be swung in opposite direction to deenergize solenoid 265 and prepare for subsequent energization of solenoid 266.

Another pair of solenoids 274 and 275 similarly controls the position of another upright arm 268a (Fig. 7) which bears a roller engaging an arm 270a fixed on the shaft 253. Thus, when the solenoid 275 is energized, the arm 268a is swung, raising the arm 270a and pulling the rod 220 to disengage the clutch. When the solenoid 274 is energized the arm 268a is withdrawn permitting the arm 270a to drop. A snap switch 276 is controlled by the arm 268a in the same way as is the switch 272 by the arm 268. The solenoid 275 is energized whenever the temperature of the griddle is below a predetermined minimum and solenoid 274 when the temperature rises to its proper level.

Temperature control

The temperature of the griddle may be determined by its own expansion and contraction. As shown in Fig. 2, a crank 277 fixed on a vertical shaft 277a journaled in the casing 75 carries a roller that bears against the inner periphery of the griddle, being urged thereagainst by a spring 278 attached to another crank 277b also fixed on shaft 277a. The latter arm is adapted to engage a resilient switch arm 278a which lies between a pair of spring contacts 279 and 279a. When the griddle is cold, the switch arm engages contact 279 but as the griddle is heated and expands the arm 276 will swing toward the left as viewed in Fig. 2, striking the switch arm 278a and moving it out of engagement with contact 279 and into contact with contact 279a. Thus, when the griddle temperature is below its proper level, the contacts 278a and 279 form a circuit energizing the solenoid 275 preventing the pouring of batter as previously described and, when the contacts 278a and 279a form a circuit to energize the solenoid 274, the griddle is at its proper temperature and batter may be poured.

The electrical connections are illustrated diagrammatically in Fig. 35. The switch arm 278a is connected to a conductor A and the snap switch 276 to a conductor B, these conductors being connected respectively to a pair of electric mains by a line switch C. The contact 279 is connected to one terminal of the solenoid 275 while the other terminal is connected to a switch point 275a which is adapted to be engaged by the snap switch 276. Similarly opposite terminals of the solenoid 274 are connected to contact points 279a and 274a respectively, the latter contact point being adapted to be engaged by the snap switch 276.

When the temperature drops below a predetermined minimum the contacts 278a and 279 are in engagement and the solenoid 275 will be energized, causing the snap switch 276 to swing from contact 275a to 274a. This not only deenergizes solenoid 275 but connects a lamp 275b across the conductors A and B so that a warning signal is given. On the other hand, when the temperature rises sufficiently for the switch 278a to engage contact 279a, solenoid 274 is energized, rocking the arm 268a to such position as to permit the rod 220 to disengage the pouring clutch and, at the same time, the snap switch 276 will disconnect solenoid 274 as well as lamp 275b from energization.

Hydrostatic batter-gage

As stated above, the solenoids 265 and 266 are controlled by the level of batter in the reservoir 52, as well as by the supply of plates in the stack 56. An ordinary float operated switch could be employed for the batter control. However, for sanitary reasons and more positive operation, we prefer to use a hydrostatic control thereby avoiding the use of bearings in the reservoir and avoiding interference with the agitator.

As shown in Fig. 19 an opening 280 is formed in a side wall of the well 121. In this opening, a bushing 281 is fitted and secured by a suitable clamping means. A gasket 282 serves to make a fluid-tight joint between the bushing and the wall of the well 121. The inner end of the bushing is formed with an annular shoulder which provides a seat for a diaphragm 283 of rubber or other suitable material adapted to close the opening 280. This diaphragm is clamped to its seat by means of a cup 284 whose bottom or inner wall 285 is spaced from the diaphragm. The latter has a metal backing plate 286 from the center of which projects a stud 287. This stud passes through an aperture in the bottom wall 285 and also through a lining 288 of insulation material fitted in the cup.

Mounted on the outer end of the stud 287 is a lever 289 which is fulcrumed on a bracket 290 (see Fig. 20) fixed to the cup 284. A coil spring 291 bears against the lever 289 and holds it in engagement with the stud 287. This spring is mounted upon a rod 291a which projects from the stud 287 and through an axially bored set screw 292. The latter is threaded through cover plate 293 fitted on the outer end of the cup 284 and provides means for adjusting the pressure of the spring 291 upon the lever 289. The cover plate is clamped against the cup 284 and the latter, in turn, is clamped against the diaphragm 283 by an annular clamping plate 293a.

Mounted to swivel on ears 294 projecting from the upper portion of the brackets 290 is a block of insulation 295. The latter is connected by a link 296 to the free end of the lever 289. Fixed upon the block 295 is a plate 297 of metal that is formed with three arms 298, 299 and 300. The arm 300 as stamped from the metal plate extends in opposite direction to that of the other two arms and is then bent back upon itself, as clearly shown in Fig. 19, thus giving a certain amount of increased resiliency to this arm and also placing the end of the arm in a different plane from that of the other two arms.

The arm 298 is formed at its free end with a pair of contact buttons, one on each side thereof and these buttons are adapted to play between a fixed contact button 301 and an adjustable contact post 302. When the reservoir is filled above a predetermined level with batter the arm 298 makes contact with the button 301, being held thereagainst by pressure of the batter against the diaphragm 283 which in turn presses the lever 289 outward, causing the arm 298 to swing inward. However, when the hydrostatic pressure against the diaphragm is reduced sufficiently the spring 291 acting on the lever 289 will swing the arm 298 outward into contact with the post 302. In practice the spring 291 is so adjusted that this takes place only when the batter reservoir contains sufficient batter for one to two orders.

In order to provide a warning of the fact that the batter is nearing depletion, the arm 300, because its free end normally lies in a plane that is outwardly spaced from that of the arm 298, will make contact with a post 303 before arm 298 makes contact with its post 302. In actual practice the parts are so adjusted that the contact between the arm 300 and the post 303 is made when the batter in the reservoir is reduced to such an extent that there remains therein only enough batter for ten orders. The cover plate 293 is made of insulation material and in this plate are screwed the posts 302 and 303 which may be carefully adjusted to insure contact with the arms 298 and 300 respectively at the predetermined hydrostatic pressures against the diaphragm. Also threaded through the cover plate 293 is another post 304 with which the arm 299 makes contact at the same time that the arm 298 contacts with post 302. Current is led to the plate 297 through a spring finger 305 secured to the end of a post 306 carried by and projecting through the cover plate 293. The button 301 is connected by a lead 307 to a post 308 which also projects from the plate 293. A connection plug 310 is provided with the usual socket members 311 to make contact with the various posts projecting from the plate 293.

*Electrical connections of the batter gage and dish control*

The electrical connections controlled by the hydrostatic gage are shown diagrammatically in Fig. 35. Closely associated therewith is the means for stopping pouring of batter when the supply of dishes in the magazine 56 nears depletion and the electrical circuits of both of these controls will now be described.

The plate 297 is connected through the post 306 to the conductor A. The conductor B is connected to the snap switch 272 which engages either a contact 266a or a control 265a. The contact 265a forms one terminal of the solenoid 265, the other terminal of which is connected by lines 311 and 312 to the button 301. A gap between these lines is normally closed by a switch 313. As will be explained more fully hereinafter, when the supply of dishes is reduced to a predetermined minimum the switch 313 is automatically operated to disconnect lines 311 and 312 and to bridge a set of contacts 314, 315 and 316. The contact 266a forms one terminal of the solenoid 266, the other terminal of which is connected to the post 302 and also by a line 317 to the contact 314. A line 318 connects the button 316 to conductor A, so that when the switch 313 bridges contacts 314 and 316 and the snap switch 272 engages control 266a the solenoid 266 will be energized regardless of the position of the batter switch 297. At such time also a lamp 319 will be energized to indicate that the supply of dishes is depleted. This lamp has one terminal connected by line 320 to contact 315 and the other terminal by line 321 to the conductor B. Another lamp 322 is used to give warning that the batter supply is low and this lamp has one terminal connected by a line 323 to the post 303. An annunciator 324 is sounded when the batter is exhausted. One terminal of the annunciator is connected by a line 325 to the post 304 while the other terminal thereof is connected by line 321 to the conductor B.

The diagram Fig. 35 indicates the position of the switches when there is an adequate supply of batter in the batter reservoir and plenty of dishes in the dish magazine. The contact arm 298 of the batter switch is in engagement with button 301, and solenoid 265, having been energized by such engagement, has thrown the snap switch out of engagement with contact 265a and into engagement with contact 266a. Thus no current is flowing through either solenoid. As the batter supply is lowered the switch arm 298 moves toward the post 302, but before reaching it the arm 300 engages post 303 completing a circuit from conductor A through line 323, lamp 322, and line 321 to conductor B. This warns an attendant that it is time to replenish the batter supply.

When the supply of batter is exhausted switch arm 298 will engage post 302 and arm 299, post 304. The circuit of the annunciator 324 will then be completed from conductor A through lines 325 and 321 to conductor B. At the same time solenoid 266 will be energized as follows: from conductor A through switch arm 300, contact 302, solenoid 266, contact 266a, snap switch 272 to conductor B. As explained above, when solenoid 266 is energized arm 268 is swung toward the left, as viewed in Fig. 8, pulling rod 220 to stop the further pouring of batter and the snap switch 272 is thrown out of engagement with contact 266a and into engagement with contact 265a. The solenoid 266 is thus deenergized but the lamp 322 continues to shine and the annunciator continues to sound the alarm until the supply of batter is replenished. As the level of batter rises in the batter reservoir the batter switch returns to normal position first disconnecting the annunciator and then the lamp 322. Finally the switch arm 298 touches the button 301 and current from conductor A flows through said switch arm and button and thence by way of line 312, switch 313, line 311, solenoid 265, contact 265a, and snap switch 272 to conductor B. This permits the pouring clutch to return to operative engagement and throws the snap switch 272 back to the normal position shown in Fig. 35 deenergizing solenoid 265.

When the supply of dishes is lowered sufficiently for the switch 313 to be thrown into engagement with contacts 314, 315, and 316, the solenoid 266 will again be energized to stop pouring. The circuit through the solenoid may be traced as follows: From conductor A by way of line 318, contact 316, switch 313, contact 314, line 317, through solenoid 266, thence by way of contact 266a and snap switch to conductor B. The snap switch will then be thrown over to engagement with contact 265a so that as soon as the switch arm is restored to normal position by a fresh supply of dishes in the dish magazine the solenoid 265 will be energized in the manner described above to permit pouring of batter to be resumed. If the snap switch happens to be engaging contact 265a when the dish supply switch is swung out of normal position nothing will happen because the pouring clutch will already have been disengaged. It will be evident, however, that pouring cannot be resumed until both the dish supply switch and the batter switch are restored to their normal positions.

*Control pin depressor*

Fixed to the lower end of the shaft 192 (Figs. 5 and 7) is a cam 330 which is engaged by a roller on an arm 331. This arm is pivoted on the bracket 101 and the outer end of the arm carries an adjustable finger 332 which overlies the burner control pins 96 in the valve control wheel 93. Thus, at each rotation of the shaft 192 the finger 332 depresses a pin 96.

The drive shaft 95 is connected by a train of gears 333 to an extension 196a of the shaft 196 and the gear ratio is such that the valve control wheel 93 will turn a distance corresponding to three pin spacings for each complete rotation of a shaft 196. Extension 196a is suitably geared to and driven by the shaft 88. Since the shaft 192 makes three turns for each turn of the shaft 196, three pins 96 will be depressed for each rotation of the shaft 196 as long as the pouring control clutch is engaged. As the batter portions poured upon the griddle are carried step-by-step, a wave of increased heat accompanies them due to the action of control pins 96 upon the burner valves 92, as explained above.

*Peel operating mechanism*

As each depressed pin 96 reaches the cake turning point it engages a cammed end of a slide plate 335 (Fig. 18a), forcing said plate inward against the action of a spring 336. An arm 337 on a vertical shaft 338 is provided with a pin which engages a slot 339 in the plate 335 and this slot is so angled that when the plate 335 is forced backward by the pin 96, the shaft 338 is turned through a predetermined angle. An arm 340 on the lower end of the shaft 338 is connected by a rod 341 to a clutch 342 (see Figs. 3 and 4) which connects the turning mechanism to power. Thus, whenever a portion of batter reaches the turning point, the clutch is engaged, and the turning peel 54 is operated to pick up the half baked cake and turn it over, depositing it raw side downward upon the griddle. Hence the turner peel operates only when there are cakes in position to be turned.

The peel 54 normally occupies the retracted position shown in Fig. 3. To turn a cake it is pressed downward into engagement with the griddle and then is advanced to slide under the cake and pick it up, after which it is tilted upward and turned over so that the cake will drop in inverted position upon the griddle, and finally the peel is retracted and restored to normal position. The mechanism which produces these various movements of the turner peel is fully described in a copending application Serial No. 616,598, filed June 11, 1932, and since issued as Patent No. 1,897,999, and requires no further description here. Suffice it to say that the mechanism is controlled by a cam set 345 journaled on a shaft 346 and operatively connected thereto by the clutch 342. The shaft 346 is driven through spiral gears 347 by the shaft 88. The clutch 342 is of the type that will automatically disengage when it has completed one rotation. Hence, the peel operates only when the cake reaches the turning position and stops after turning each cake. Empty spaces on the griddle are accompanied by raised pins 96 which will pass over the slide plate 335 without operating the same.

After being turned the cakes are carried by the griddle step by step, to the removing point where they are picked up by the peel 55. This peel normally occupies the horizontal position shown in Fig. 3 and in operation is first tilted to engage the griddle, and then slides forward to peel off the cake and carry it clear of the griddle and past a stripper 350. Thereupon the peel rises to horizontal plane and returns to its original position. During the return movement of the peel the griddle cake being engaged by the stripper 350 is swept off the peel and drops on a suitable dish.

The operation of the delivery peel 55 differs from that of the turning peel 54 in that it has no turning motion and also in that it has a much longer reciprocating motion. The mechanism for operating the peel 55 is fully disclosed in a copending application Serial No. 465,755, filed July 3, 1930, and since issued as Patent No. 1,904,198. This mechanism is controlled by a cam set 351 journaled on shaft 352 and operatively connected thereto by a clutch indicated at 353 in Fig. 4. Normally this clutch is disengaged but is operated to connect the cam set 351 to shaft 352 whenever a cake comes into position to be removed by the peel 55. The shaft 352 is driven through spiral gears 354 by the shaft 88.

The clutch 353 like clutch 342 is actuated by depressed pins 96. A pull rod 355 for operating the clutch is connected to a crank 356 on the lower end of the vertical shaft 357 which at its upper end has a crank 358 (Fig. 18B) fixed thereto. A pin on the latter is held by a spring, in engagement with a notch in a star wheel 359. The latter is mounted in such position as to clear the pins 96 that are in normal raised position but to be engaged and turned by each depressed pin 96 that passes thereby. The star wheel is turned through an angle equal to the space between two notches by each pin 96 that engages it. At each step of the star wheel the crank 358 is swung outward, causing the clutch 353 to connect the cam set 351 to power and as soon as the latter has completed a rotation the clutch is automatically disengaged.

The star wheel also serves as a control for the delivery of dishes to receive the cakes. Projecting from the upper face of the star wheel are two pins 360 on diametrically opposite sides of the wheel. These pins are adapted to engage an arm 361 fixed to the upper end of a shaft 362. The lower end of this shaft has a crank 363 which is connected by a rod 364 to a clutch 365 (Fig. 4) for controlling the operation of the dish handling mechanism which will be described more fully later on. Normally there is a dish in position to receive the cakes that are delivered by the peel 55. When there have been three operations of the delivery peel, one of the pins 360 will swing the arm 361 outward causing operation of the dish handling mechanism.

Beyond the star wheel the pins 96 ride over the fixed cam 99, Fig. 5, just before they pass under the finger 332 so that any depressed pin 96 is raised by the cam to normal inoperative position. However, just before being raised by this cam each depressed pin initiates the operation of the mechanism 65 for wiping the griddle so that it will be in proper condition for the next pour of batter. As shown in Fig. 25, the valve control arm 97 at this point is provided with an angular extension 396 which is connected by a push rod 397 to a crank 398 pivotally mounted on the pouring bracket 101. This arm controls a clutch connecting the griddle wiping mechanism to power.

Griddle wiping mechanism

The main frame 400 of the wiping mechanism 65 has a supporting stud 401 fixed thereto (see Fig. 21). The outer projecting end of the stud is adapted to fit into the bore of a hollow boss 403 formed on the bracket 101. After the stud has been inserted in the boss, it is locked in place by means of an eccentric pin 404 which may be turned by a handle 405 to draw the stud snugly into the boss. Another stud 406, projecting from the frame 400, engages a socket in another boss 407 projecting from the bracket 101 and serves to keep the frame from turning about the stud 401 as an axis. The stud 401 projects to the right of the frame 400, as viewed in Fig. 21, and provides a support for a supply roll 410 preferably of absorbent paper; a take-up wheel 411 is mounted on a shaft 412 above and to the left of the supply roll, as viewed in Fig. 24. The paper as indicated by the line W (see Fig. 22) passes from the supply roll about a pair of spaced rollers 413 and thence runs to the take-up roll.

The rollers 413 are flexibly supported by cross arms 415 and 416 mounted near opposite ends of a shaft 417 (see Fig. 23). Each roller 413 comprises a tube fitted with an inner sleeve 420. This sleeve in turn is mounted on a hub shaft 421. A universal joint connection 422 is provided between each hub-shaft and the cross-arm 415 and a similar universal joint connection 424 is provided between the hub shafts and a pair of shafts 425 journaled in the cross arm 416. The cross-arms are freely journaled on the shaft 417, and are spring connected to said shaft. To this end a pair of poles 426 are keyed to the shaft 417, one near each end thereof, and the springs 427 connect the plates 426 to the cross-arms 415 and 416 respectively. The purpose of this flexible connection between the shaft 417 and the rollers 413 will appear hereinafter.

A gear wheel 435 is mounted to turn freely on the shaft 417. This gear wheel meshes with a pair of idlers 436, Fig. 24, which in turn mesh with pinions 437 fixed respectively on the shafts 425. Thus, the pinions 437 and the gear 435 turn in the same direction. Fixed upon the shaft 417 is a toothed sector 439 which is adapted to engage a gear segment 440 (Fig. 22) fixed upon a shaft 441. The shaft 441, as shown in Fig. 26, is journaled in the bracket 101. The gear 435 is driven by a gear 445 mounted on the stud 406 and the latter gear meshes with a gear 446 mounted on a shaft 447 journaled in the bracket 101.

Oscillation of the shaft 441 tilts the rollers 413 from the position they occupy in Fig. 24 to that shown in Fig. 22 so that the paper passing about the lower roller 413 is brought in contact with the griddle. At the same time the shaft 447 is rotated so as to feed paper from the supply roll to the take-up roll. The tilting of the gear segment 440 and rotation of the shaft 447 is effected by means of cams journalled on the shaft 196. Motion is imparted to the wiping mechanism once for each cake, or three times for each order. The shaft 196, however, rotates once for each order, consequently there are three operations of the shafts 441 and 447 for each rotation of the shaft 196.

As best shown in Fig. 26, the shaft 441 has a crank 448 fixed thereto. This crank bears a roller which engages a groove in a drum cam 449 formed on a sleeve upon the shaft 196. The shape of the cam groove is such as to produce three oscillations of the shaft 441 for each complete turn of the shaft 196.

The shaft 447 has secured thereto a disc 450 from which project six rollers 451, also a part of the sleeve carrying the cam 449 is formed with a spiral groove 452. This groove is engaged by the rollers 451 and the arrangement is such that for each turn of the shaft 196 one of the rollers 451 is engaged and the disc 450 is turned through an angle of 60 degrees. The spiral 452 is not regular but is of such form as to produce three intermittent movements of the disc 450, one for each operation of the segment 440. Thus, when the cams 449 and 452 are engaged by the shaft 196 the paper will be brought into contact with the griddle three times and at each contact there will be a feed of paper controlled by the cam 452.

The griddle wiper is operated whenever the cams 449 and 452 are operatively connected to the shaft 196, as will now be explained. A notched collar 460 is pinned to the shaft 196, and a disc 461 is formed on the end of the cam 449. A clutch lever 462, in the form of a bell-crank, is pivoted on the under face of the disc. One arm of the lever terminates in a tooth adapted to engage the notches in the collar 460, under tension of a spring 463 connected to the other arm. The latter arm is formed with a depending pin 464 which, with the clutch in disengaged position, as shown in Fig. 25, engages the end of a clutch operating arm 467, holding the tooth out of engagement with the notches in the collar 460. The clutch operating arm 467 is secured to a vertical shaft 468 and the latter has the crank 398 fixed thereon, this crank being connected to the push rod 397, as explained above. The clutch lever 462 is provided with an extension 470 beyond the pin 464 which extension engages a square shouldered lug 471 on the end of the arm 467.

When the push rod 397 is moved toward the left, as viewed in Fig. 25, by engagement of a depressed pin 96 with control lever 98, the arm 467 is swung counterclockwise so that at first it clears the pin 464 and thereafter the lug 471 clears the end of the extension 470. When this occurs the spring 463 forces the tooth of the clutch lever 462 into engagement with one of the notches in the collar 460, thereby connecting the cams 449 and 452 to power. The reason for the extension 470 and the lug 471 is to effect a sudden release of the bell-crank 462; for, if the release was effected solely by movement of the arm 467 past the cylindrical pin 464, there would be a comparatively gradual release of clutch lever, whereas the square shouldered lug 471 provides an instant release as soon as it clears the end of the extension 470. If it were not for this sudden release the tooth on the lever 462 might not properly engage a notch in the collar, and either wear off the edge of the notch or slip out of it before completing a rotation of the cams. At the same time the rounded pin 464 is desirable in place of a square shouldered lug to reduce wear when withdrawing the tooth from the notch.

When the cams have made one complete revolution they are disconnected from the shaft 196, provided the push rod 397 is not in the meantime actuated again. This disconnection is effected as follows: The end of the arm 467 is cut on an angle with respect to its longitudinal axis, so that when the pin 464 encounters the end of this arm it is depressed to the position shown in Fig. 25, withdrawing the tooth from the collar 460. An arm 467a fixed to the shaft 468 engages a fixed stop when the parts are in the position shown in Fig. 25 and supports the thrust of the arm 467 when the pin 464 slides along the angled end thereof.

To prevent overthrow of the cam group, a lever 472 is provided, which is fulcrumed on a stud 473. This lever carries a roller 474 which bears on the periphery of the disc 461. The latter is provided with a notch 475 which is entered by the roller when the clutch is disengaged, being urged into the notch by a spring 476. As the roller 474 enters the notch 475 it produces a forward thrust of the disc 471 with respect to the shaft 196 so as to relieve the drag on the tooth of the clutch lever 462. This facilitates withdrawal of the tooth from the notch, and at the same time engagement of the roller with the notch prevents overthrow of the cam group and holds the cams in the position shown in Fig. 25. However, it is not desirable to have this overthrow mechanism operate at each rotation of the cam because under normal conditions, where there is no interruption in the supply of batter cakes, the cams rotate continuously and the clutch will not be thrown out of engagement with each rotation thereof.

The mechanism which prevents operation of the overthrow mechanism will now be described: The arm 472 is formed near its pivot, with an arcuate edge 477 struck on a center that coincides with the axis of shaft 468 when the roller 474 is in the notch 475. This arcuate edge terminates at its outer end in a tooth 478. A retaining arm 479 is journaled on the shaft 468 and is provided with a tooth 480 adapted to coact with the tooth 478, but normally lying in position shown in Fig. 25, clear of the tooth 478 and in close proximity of the arcuate edge 477. A spring 481 connects the arm 479 to a pin 482 projecting from the arm 467. This pin rises above the plane of the arm 479 and serves as a stop against which the arm is drawn by the spring 481. When the rod 397 is pushed toward the left, as viewed in Fig. 25, the arm 479 cannot immediately follow because it is stopped by engagement of the tooth 480 with the tooth 478 and as a result the spring 481 is placed under tension. As soon, however, as the clutch is engaged and the roller 474 rides out of the notch 475 the arm 472 is swung counterclockwise, withdrawing the tooth 478 from the path of the tooth 480 and permitting the arm 479 to yield to the pull of the spring 481. This brings the tooth 480 opposite the end of the tooth 478 so that the arm 472 cannot return to the position shown in Fig. 25, until the lever 467 is returned by engagement of a pin 96 in normal raised position with the arm 97 to which the rod 397 is connected. If there is no interruption in the series of cakes on the griddle, successive pins 96 will be in depressed position and will maintain the lever 467 in the clutch releasing position. As long as this occurs the roller 474 cannot enter the notch 475 and consequently there will be no fluctuation in the movement of the cam system. However, when there is a break in the series of orders, a pin 96 in normal raised position will strike the arm 97, pulling the rod 397 and restoring the lever 467 to the normal position shown in Fig. 25. Thereupon the pin 482 will force the lever 479 clear of the tooth 478 and permit the roller 474 to enter the notch 475 as soon as the disc 461 has completed a rotation.

When the wiping mechanism functions, the paper carried thereby moves in reverse direction with respect to the direction of rotation of the griddle so as to produce a wiping action. The arrangement is such that when the rollers 413 are tilted to the position shown in Fig. 22, there is no substantial increase in the length of paper between the roll 410 and the roll 411, for as one of the rollers 413 moves downward the other moves upward. The amount of paper fed at each operation is slight, but just sufficient to bring a fresh portion of paper into contact with the griddle.

Because of the universal joints between the rollers 413 and the cross-arms 415 and 416 the latter may twist with respect to each other, and their spring connection to the shaft 417 enables them to adapt themselves to any unevenness in the surface of the griddle. It will be understood, of course, that the griddle surface may vary, due to thermal-expansion, and it is essential that the roller 413 carrying the paper into contact with the griddle make contact with said griddle along the entire length of the roller so that the griddle will be properly cleaned.

In order to maintain requisite tension in the paper between the two rolls, a friction mounting is provided for the rolls. As shown in Fig. 21, that portion of the stud 401 which carries the roll 410 is formed with a longitudinal slot in which a friction bar 490 is radially slidable. Springs 491 urge the bar outwardly and screws 492 limit the extent of such outward movement. Fitted upon the stud over the friction bar is a sleeve 493 and on the latter is removably mounted a core 494 of the roll of paper 410. A pin 495 projecting from the sleeve 493 engages a slot 496 at the inner end of the core 494, so that when the core is turned by withdrawal of paper therefrom, it compels rotation of the sleeve 493 and the latter is retarded by frictional engagement with the bar 490. At the same time the core 494 may be easily slipped on and off the sleeve without disturbing the frictional engagement of the sleeve with the stud 401.

A suitable latch 497 is mounted eccentrically on the end of the stud 401 and serves to hold the roller in place when it is swung to the extended position, shown in Fig. 24. However, when this latch lever is turned through an angle of 180 degrees it clears the reel permitting the latter to be withdrawn. A spring-pressed pin 498 (Fig. 21) bearing against one of a pair of opposed flattened faces on the shank of the latch, holds the latch either in the normal position illustrated, or in its retracted position.

The mounting of the take-up roll is somewhat different from that of the supply roll. The shaft 412 passes through a tubular stud 500 which is fixed to the casing (see Fig. 23). Mounted to rotate on this stud, is a sleeve 501 which, at its outer end, is formed with a solid head 502. The shaft 412 extends into and is pinned fast to the head. A core 503 of the take-up roll is fitted to slide upon the sleeve and has a slot 504 at its inner end adapted to be engaged by a pin 505 projecting from the sleeve 501. The core 503 is normally retained upon the sleeve 501 by a latch 506 which is similar to the latch 497 for the supply roll.

The take-up roll is positively rotated to insure the necessary feed of paper. To this end, a pulley 508 is fixed to the shaft 412 and a belt 509 preferably of coiled wire runs from the pulley 508 to a pulley 510 carried by the gear 435. This belt is crossed, as indicated by broken lines in Fig. 24, so that the roll 411 will turn in opposite direction with respect to the roll 410. Obviously there would be a variation in the rotation of the roll 411 as the take-up paper is pulled up thereon. However, this is taken care of by the resiliency of the belt 509.

The object of turning the take-up roll in opposite direction with respect to the supply roll is so that when the supply of paper has been entirely wound off the core 494 and upon the take-up core 503, the latter may be shifted to the supply roll mounting and the core 494 to the take-up roll mounting. The paper may then be run through the wiping mechanism a second time, but because of the reversal of direction of rotation of the two rolls the opposite face of the paper will now be presented to the griddle. Thus, each supply of paper may be run twice through the mechanism, that is, first one face bearing against the griddle and then the other.

A suitable casing 512 is fitted over the griddle wiper, this casing being secured to the main frame 400 with a friction fit so that it may readily be removed whenever desired to permit of replacing the rolls of paper. It will also be evident that the mechanism may be readily removed from the main bracket 101 whenever desired by merely turning the handle 405 and withdrawing the pin 404 from engagement with the stud 401.

*Griddle Scraper*

Previous to wiping the griddle, means are provided for removing cooked spatterings of batter from the griddle which are at times deflected from the cake during the inverting operation by the peel 54. To this end, a scraping mechanism 64 (Figs. 1, 5, 5A and 5B) is mounted radially across the griddle surface between the cake removing peel 55 and the wiping mechanism 65.

The scraper consists of a continuously revolving screw 513 journaled in a pair of supports 514 which are secured to each other by a pair of tie rods 515. Fixed on the rods 515 are ball bearing rollers 516 which ride on the griddle surface and position the screw a slight distance therefrom (Fig. 5B). The screw 513 is partly encompassed by a semi-cylindrical shell 517 secured in end plates 518 pivotally mounted on the shaft of the screw. The lower portion of the shell 517 terminates in a knife edge which contacts with the griddle, being urged thereon by springs 518a connected between the end plates and the supports 514. This construction insures a scraping edge on the griddle surface regardless of wear, for, as wear occurs on the lower edge of the shell 517, compensation automatically takes place due to the action of the springs 518a which force the shell, and hence the knife edge, about its center and in continuous contact with the griddle.

The frame 514 shown at the left hand side of Fig. 5A, has fixed thereto a stud 519 which is constrained by a slot in the upper end of a plate 520 fixed on the inner face of the annular casing 75. The opposite frame 514a (see particularly Fig. 5) is positioned by a headed stud 521 fixed in the outer portion of the casing 75. The latter frame 514a is free to move axially on the stud 521 but is restrained by a compression spring 522 placed between the head of the stud and the upper surface of the frame, thus keeping the adjacent pair of rollers 516 in contact with the griddle. Similarly, a tension spring 523 secured to the stud 519 in the left hand frame 514, (Figs. 5A and 5B) maintains the contact between the opposite pair of rollers 516 and the griddle. This flexible mounting of the scraper is necessary to keep the knife edge of the shell 517 in continuous radial contact with the griddle, as the griddle, when heated, has a tendency to warp slightly from its normal horizontal place.

One end of the screw 513 has a shaft extension 524 (Fig. 5A) which is connected by a universal shaft (not shown) through a train of gearing (not shown) to the continuously revolving shaft 196a.

In operation, the cooked particles of batter as the griddle revolves, strike the knife edge of the shell 517 and are arrested. These particles are then removed by the continuously revolving screw 513 to an opening 524a in the outer edge of the casing (Fig. 5A) where they are dropped through a suitable chute and into a container (not shown) mounted in the lower portion of the machine.

*Dish handling mechanism*

When the cake is stripped from the peel 55 by the member 350 it drops upon a dish 525 resting upon an elevator 526. (See Figs. 3 and 4). This elevator has a vertical stem 527 in which rack teeth are cut and which passes through a lateral extension 70a of the base plate 70. The rack is engaged by a gear 528 suitably journaled in a bracket 529 which depends from the extension 70a. A pinion 530 fixed to the gear is engaged by gear segment 531 on one arm of a lever 532. The other arm of this lever carries a roller 533 which engages a groove in one face of a cam 534. Thus, by operation of this cam the elevator 526 may be raised and lowered.

Normally the cam stands idle and is connected to power by the clutch 365 which is actuated by the rod 364 when three cakes have been deposited upon the plate, as explained above. As soon as the clutch is engaged the cam lowers the elevator until the plate 525 is deposited upon a pair of rails 536 (see also Fig. 27). Thereupon a pair of fingers 537, each carried by a pair of parallel levers 538 and 539, slide the plate along the rails and into the chamber 58 below the griddle. The two levers 538 are fixed to a common shaft 538a and a link 540 connects one of the levers to one arm of an angle lever 541. The other arm 542 of this lever carries a roller which engages a cam groove in the opposite face of the cam 534. Under control of this cam groove the fingers 537 are drawn forward to slide the dish into the chamber 58.

As soon as the dish 525 clears the elevator, the latter is raised by the cam 534 to pick off the bottom dish from the stack in the dish magazine 56. The dishes in the magazine are supported on fingers 545 projecting from an annular frame 546, mounted on tubular supports 547. When the elevator rises it relieves the fingers 545 of the weight of the stack and the fingers are then withdrawn so that when the elevator is lowered the stack of dishes will ride down on the elevator until the rim of the bottom dish drops below the fingers; whereupon the fingers will be projected under the rim of the dish next below said bottom dish. The elevator will continue downward until it reaches the position shown in Fig. 3 where it will come to rest with the dish thereon in position to receive the next order of cakes.

Obviously, the member 350 must be swung out of the way to clear the elevator as the latter rises to pick off a dish from the stack and must return to normal stripping position after the dish has been carried down to cake receiving position. Suitable mechanism for operating the fingers 545 and the member 350 is fully described in said copending application Serial No. 465,755, filed July 3, 1930. This finger operating mechanism is actuated in timed relation to the movement of the elevator by a shaft 550 (Fig. 4) which passes through one of the tubular supports 547 and is driven by the cam 534 through a train of gearing. This train includes a gear segment 551 on one arm of a lever 552, the other arm of which bears a roller that engages a groove in the face of cam. The mechanism for swinging the stripper 350 to and from normal position is similarly actuated by a shaft 553 driven through suitable gearing by a gear segment 554 on one arm of a lever 555 the other arm of which has roller engagement with a groove in the cam 534.

Figure 1:
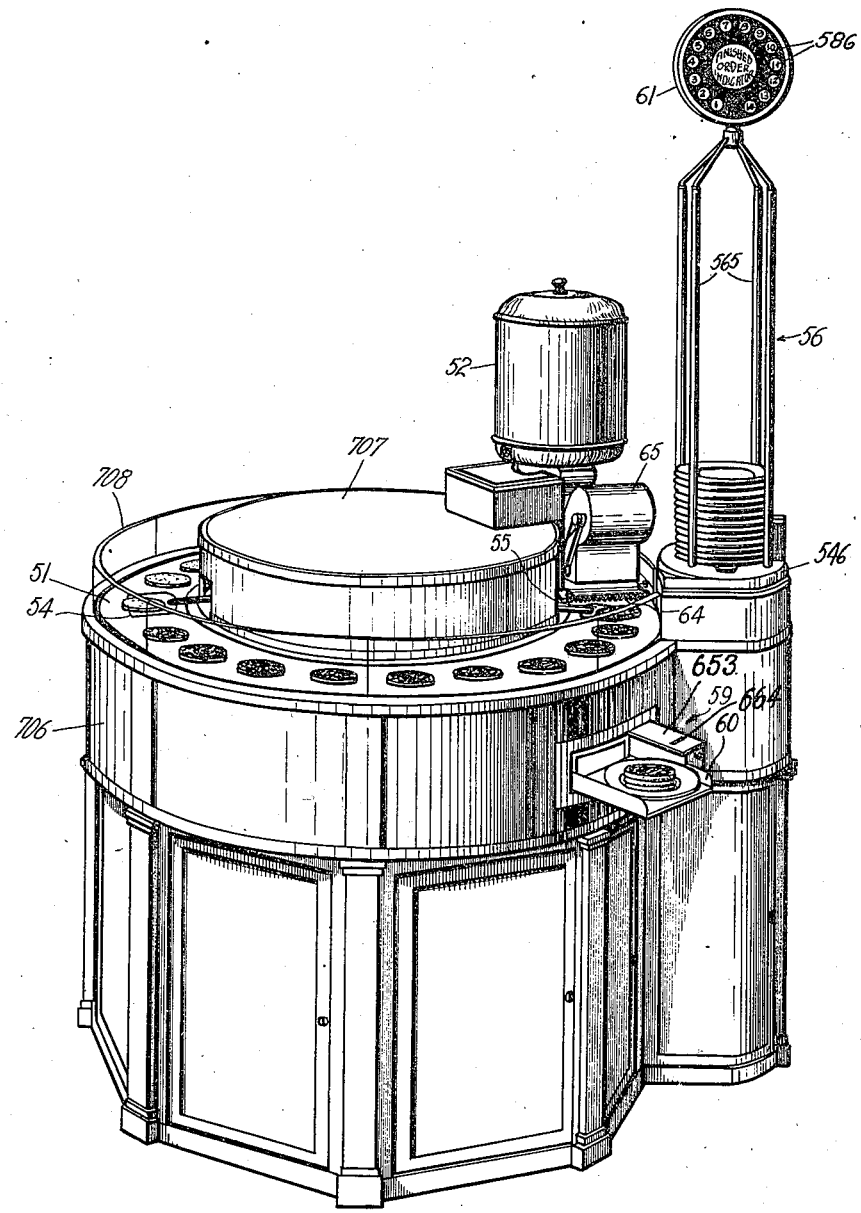
Figure 1 is a view in perspective of a cake baking machine embodying our invention.

As shown in Fig. 1, there are four columns 565 which rise from the annular support 546 and serve to keep the dishes from toppling over in the dish magazine. These columns support the dial 61. At one side of the support 546 there is a feeler 566 (Fig. 3B) which presses against the dishes in the stack. This feeler is connected to the electric switch 313 so that normally the switch is held open by the dishes in the stack. When, however, the number of dishes is reduced below a predetermined figure, the feeler moves inward under spring pressure moving the switch from its normal position bridging lines 311 and 312, as shown in Fig. 35, to the position shown in Fig. 3B, in which contacts 314, 315 and 316 are bridged, thereby stopping the pouring mechanism and energizing the lamp 319, as explained above. In the particular embodiment illustrated there is space on the griddle for twenty-one cakes and as there are three cakes to an order this requires seven dishes. Accordingly the feeler is arranged to stop pouring when there are only seven dishes left in the stack, but the rest of the machine will continue to function so that the cakes that have been poured may be delivered.

*Storage chamber and conveyor*

When a dish 525 bearing an order of cakes is slid, by the fingers 537, off the rails 536 (Figs. 3 and 27) into the chamber 58, it is picked up by the conveyor 57 which carries it along the chamber to the delivery point, or if there are intervening dishes it is arrested at a predetermined distance from the preceding dish of cakes.

The conveyor 57 consists of an annular plate supported on rollers 570 journaled in the base plate 70, as shown particularly in Figs. 3 and 4. A number of rollers 571 bear against a flange formed on the conveyor and serve to prevent lateral displacement of the conveyor. The conveyor itself has teeth formed thereon which engage with a pinion 572 driven through a train of gearing 573 (Fig. 4) by the shaft 88. It will be understood that the dishes merely rest on the conveyor 57 and are driven by frictional engagement therewith. However, if for any reason a dish is arrested the conveyor merely slides under the dish.

In order to prevent the dishes from jamming one against the other when one of a series of dishes is arrested, there is provided a number of gate levers to preserve a predetermined spacing between the dishes on the conveyor. This mechanism is illustrated in Fig. 27. It will be observed that there are two flange rails 581 and 582 disposed respectively at the outside and the inside of the annular conveyor 57, which serve as guides for the dishes, to compel them to pursue an annular course. Projecting from the base plate 70 under the flange rail 582 is a series of vertical studs 583 (Fig. 29). Pivotally mounted at the top of each stud is a gate lever 584 formed with ears 585 and 586 disposed respectively at the rear and forward ends of the lever. These ears lie in the path of the dishes and each gate lever is so disposed that a dish striking first the ear 585 and then the ear 586 causes said lever to oscillate. When the forward ear 586 of the lever is deflected by the passage of a dish the other ear 585 is moved outward and serves as a bar to prevent the next dish from passing until the forward ear has been cleared by the dish engaging it. The foremost dish in the chamber 58 is brought to rest at the delivery point and the rest of the dishes in the chamber will be spaced from said foremost dish by the gate levers, as clearly shown in Fig. 27.

There is a gate lever for each dish position in the conveyor and means are provided for signalling the depression of a gate lever by the passage of a dish to the dial 61 so that the progress of an order through the chamber 58 may be followed on the dial 61. To this end, the dial is provided with a number of windows 586 (Figs. 1 and 3) bearing numerals from 1 to 14 to indicate the 14 dish positions in the chamber 58, and back of each window is a lamp 587 (Fig. 35) which is lighted at each depression of the gate lever at the corresponding position in the chamber 58. The lighting of the lamps is effected as follows:

Mounted upon each stud 583, but suitably insulated therefrom and from each other, are a pair of flexible switch fingers 588. A pin 589 of insulating material depends from the forward end of each gate lever, so that when said end of the gate lever is depressed by a dish the switch fingers will be pressed into mutual contact, closing a circuit through the lamp at the corresponding position on the dial 61. Thus, as each dish moves along the conveyor 57 its progress may be noted by watching the dial 61, where successive flashes of light will indicate the instant position of the dish. The dishes that come to rest at the delivery point and successive points back of the delivery point, will be indicated by illumination of corresponding lamps 587 in the dial 61, and by reading the numbers in the windows 586 it will be possible to determine at any time how many undelivered orders there are in the chamber 58.

The gate lever 590 at the delivery point differs from the gate levers 584 in having a curved forward arm, as shown clearly in Fig. 28, this curvature being necessary to clear a pin 591. This pin is one of a pair on a cross-head of a pusher 592 by which the dish at the delivery point may be pushed out upon the delivery shelf 60. The signal indicating the presence of a dish at the delivery point is not operated by the gate lever 590, but by a lever 593 which is engaged by the dish itself and operates as a stop for the dish. This lever when depressed by the dish causes mutual engagement of a pair of fingers 594, thereby closing the circuit of the lamp 587 which indicates the presence of the dish at the delivery point. The lamp circuits are shown in Fig. 35.

The pusher 592 is formed with a stem 595 which slides in a bearing 596. Rack teeth are cut in the stem 595 and are engaged by a gear 597. The latter is fixed upon the upper end of a vertical shaft 598 which has suitable bearings in the plate 70. The lower end of the shaft bears a spiral pinion 599, as shown in Fig. 31, and this is adapted to be engaged by a gear segment 600. This gear segment is journaled in a bracket 601 depending from the plate 70 and carries a roller 602 which is adapted to engage a cam 603 (Fig. 4). Thus, under control of the cam 603 the pusher will be moved outward forcing the dish at the delivery point out upon the delivery shelf 60 and then the pusher will return to normal position.

In order to prevent unauthorized access to the dishes in the chamber 58 there is a gate 605 which normally bars the passage from the chamber 58 to the shelf 60. This gate must be opened before the dish may pass out upon the shelf. As shown in Figs. 30 and 31, the gate 605 is arranged to slide vertically in grooves formed in a pair of side walls 606 of the shell 60. The gate 605 is formed with rack teeth at each end and these teeth are engaged by a pair of pinions 607 secured to opposite ends of a horizontal shaft 608. One of the pinions 607 is engaged by a pinion 609 on a stud shaft and another pinion 610 is fixed to rotate with the pinion 609. A rack 611 is provided to cause rotation of the pinion 611 and thereby to rotate a pinion 607 and raise or lower the gates 605. The rack 611 is arranged to be moved vertically by an arm 612 to which it is connected by a link 612a. This arm is fulcrumed in the bracket 601. Fixed to move with the arm 612 is another arm 613 which at its free end carries a roller 614, and the latter engages a groove in the cam 603. Thus, at each rotation of the cam 603, the gate 605 is lowered and then the pusher is operated to push a dish out on the shelf 61 after which the pusher returns to normal position and the gate is then raised.

While there is a dish in the delivery position, the gate lever 590 occupies the position shown in Fig. 28 and bars a subsequent dish from entering said position. It is important that the gate lever 590 remain in barring position while the pusher is operating so as to prevent interference with the dish that is being delivered by a subsequent dish in the chamber 58. To this end a latch is provided for locking the gate lever 590 in barring position. Fixed to move with the gate lever is a latch arm 620, the outer end of which is turned upward to engage a notch in one arm 621 of a latching lever. The other arm 622 of this lever has a trigger finger 623 pivotally mounted thereon and normally pressed against a stop 624 by a spring 625, as shown in Fig. 28. A spring 626 acting on the arm 622 tends to turn the latch lever in counterclockwise direction, as viewed in Fig. 28. Projecting from the gear 597 is a pin 627. When the pusher is operated to push a dish out upon the shelf 60 the gear 597 turns in clockwise direction, as viewed in Fig. 28 and a pin 627 wipes past the finger 623 without unlatching the gate lever 590. However, on the return of the pusher 592, the pin 627 passes in opposite direction and engages the finger 623, causing the lever 622 to be swung in clockwise direction against the pull of the spring 626 and thus withdraws the arm 621 from engagement with the turned up end of the arm 620, thereby unlatching the gate lever 590. The spring 626 connects the arm 622 with a short arm 628 projecting from the gate lever so that as soon as the arm 621 is withdrawn from the arm 620 the gate lever 590 will be pulled by the spring 626 to the position shown in Fig. 30 where it will no longer bar entrance of a dish to the delivery point. However, as soon as a dish has entered the delivery point it will strike the end of the curved arm of the gate lever 590, restoring the arm to barring position, and in this position it will be immediately locked by engagement of the arm 620 with the latch lever 621.

The cam 603 which operates the pusher is mounted to turn freely on the shaft 352 and is connected to said shaft by a clutch which is thrown into engaging position, indicated generally at 635 in Fig. 31, whenever it is desired to withdraw a dish from the storage chamber 58. The clutch is of the type which will automatically throw itself out of enagement when the clutched parts have made one full turn. The clutch is provided with an operating lever 636 connected by a rod 637 to the core of a solenoid 638. When the solenoid is energized the lever 636 is operated to permit engagement of the clutch. As will be explained presently, the energization of the solenoid is momentary and as soon as the magnetic pull on the rod 637 ceases, a spring 639 restores the lever 636 to normal position so that it will disengage the clutch as soon as the cam has made one complete rotation.

*Token controlled delivery mechanism*

The circuit of the solenoid 638 is controlled by a switch 650, Fig. 33. However, there is a mechanical interlock between the means for operating this switch and the switch lever 593 so that switch 650 cannot be closed unless switch lever 593 is closed and it will be impossible to operate the pusher when there is no dish in the delivery position bearing against the lever 593.

The switch 650 comprises a pair of spring fingers which tend to move into mutual engagement but are normally spread apart by engagement of an arm 651 with one of the fingers. The arm 651 is part of a lever mounted on a stud 652 projecting from the casing 653 of the token receiver 59. Another arm 654 integrally connected with the arm 651, but projecting in the opposite direction, is normally engaged by an arm 655 secured to a shaft 656. Also secured to this shaft is a latch arm 657 which is normally engaged and held in latched position by a notched arm 658 of a bell-crank lever mounted to turn on the shaft 652. The other arm 659 of this lever is connected by a push bar 660 to an arm 661 of the lever 593. This lever, as shown in Fig. 32, is normally pulled by a spring 662 in such direction as to hold the latching arm 658 in engagement with the arm 657. Accordingly, the switch 650 is normally held in open position. When a dish strikes the lever 593 the arm 658 is withdrawn from the arm 657 and, under the impulse of a spring 663, the arm 651 would be withdrawn from the switch 650, permitting the latter to close. However, other mechanism is interposed to prevent closure of the switch 650, this mechanism being controlled by the insertion of the token in the casing 653, so as to prevent unauthorized withdrawal of cakes from the machine.

A slot 664 is provided in the top of the casing 653 through which the token is inserted into a pivotally mounted frame 665. The token may consist of a flat piece of metal with various identifying perforations therein. When the token is inserted in the slot 664 it enters a pair of oppositely disposed grooves 666 (Fig. 34) in the frame 665 and the lower end of the token engages a spring-pressed arm 667 mounted to turn freely on the shaft 656 but secured to the latch arm 657. Fixed upon said shaft is a lever 668 which has pin-and-slot engagement with a member 669 slidable in the receiver. The slide member 669 is formed with pins 670 which are in proper position to engage the perforations in the token. A spring 671 connects the lever 668 to the lever 667 so that when the latter is depressed by the token the slide 669 will be advanced and the pins 670 will endeavor to enter the perforations in the token. If, however, the token is not provided with perforations in the authorized position and of the authorized number, one or more of the pins will strike the body of the token and limit the advance of the slide 669, in response to the pull of the spring 671. Hence, as soon as the customer releases his pressure on the token, the latter will be thrown out of the slot by the pull of a spring 672 acting on the lever 667. If, on the other hand, a proper token is inserted in the slot the slide 669 will be able to move forward with the pins penetrating the perforations and in so doing will turn the shaft 656 to which it is secured sufficiently for the arm 655 to release the arm 654. Thereupon the switch 650 will close. However, such release cannot take place as long as the latch arm 658 is holding the arm 657, as shown in Fig. 33.

There is also another latch to prevent closure of the switch 650. If, for instance, there should be a dish on the shelf 60 it would not be advisable to operate the pusher to push another dish out on the shelf. Consequently, a feeler arm 675 is provided, which normally projects through a slot in the floor of the shelf 60. When there is a dish on the shelf 60 the feeler arm 675 is depressed. This feeler arm is connected to one end of a shaft 676 which passes under the shelf and through the casing 653. Fixed upon the shaft is a crank 677 which is normally pulled toward the right, as viewed in Fig. 33, by a spring 678. Mounted on the shaft 676 but not fixed thereto is a bell-crank lever 679, one arm of which is pressed against a stop 680 on the arm 677 by a spring 681. The other arm of the bell-crank lever terminates in a hook 682 which is adapted to engage the free end of the arm 657. Normally, however, the hook stands clear of the arm 657, but when the feeler 675 is depressed by a dish on the shelf 60 the hook 682 engages the end of the arm 657 and prevents the shaft 656 from rotating. As the arms 657 and 667 have a fixed relation, the engagement by the latches 658 or 682 with the lug on the arm 657 will prevent a token from being fully inserted, thus maintaining the switch 650 in open position and preventing the forward movement of the slide 669.

The frame 665 in which the grooves 666 are formed is fixed upon a shaft 685 which is suitably journaled in the casing 653. Means are provided for rotating the shaft 685 to invert the frame 665, so that the token inserted in the grooves 666 may be ejected into a receptacle 686. To this end a pinion 687 is fixed upon the shaft 685 and meshes with a gear segment 688 mounted to rotate on a stud shaft 689. Also mounted on this stud is another gear segment 690 which meshes with a pinion 691 fixed upon the shaft 608. An adjustable connection is provided between the gear segments 688 and 690. Thus, the segment 690 is provided with an upwardly projecting arm 692 which is embraced by a yoke 693 carried by the segment 688. A pair of adjusting screws 694 in the yoke 693 are adapted to engage opposite sides respectively of the arm 692. By this means, the segments 688 and 690 are fixed to move as one, but at desired relative adjustment.

When the switch 650 is closed by insertion of a token in the token receiver the shaft 608 is rotated to lower the gate 605. At the same time through the pinion 691, segments 690 and 688 and a pinion 687 the shaft 685 is rotated, inverting the frame 664. When the frame is inverted the arm 655 engages a pin 695 projecting from the casing 653, thereby turning the shaft 656 and withdrawing the slide 669 with its pins 670. As soon as these pins have been drawn clear of the token, the arm 667, acting under impulse of spring 672, will eject the token into the receptacle 686. It will be understood, of course, that the shaft 656 is mounted in the frame 664 so that when the latter is rotated, the arm 655 is revolved about the shaft 685. After the dish has been delivered upon the shelf 60, the gate 605 is raised by the cam 603 and the frame 664 is returned to its normal position with the arm 655 striking the arm 654 and opening the switch 650. The arm 657 snaps past the shouldered end of the arm 658 which will now be in raised position until the next dish enters the delivery point and depresses the lever 593.

The mechanism described above provides for delivering the orders under control of a token. However, under certain circumstances it may be desirable to dispense with the use of tokens and to actuate the machine by others than the cashier. If, for instance, the machine is used in a restaurant and is operated by waiters or others the use of tokens may be unnecessary. For this reason means are provided whereby the switch 650 may be closed manually. Projecting from the arm 655 is a pin 696 which normally bears against one arm of a bell-crank lever 697 fulcrumed on a stud 698 projecting from the casing 653. The other arm of the bell-crank lever is pivotally connected to a push rod 699 which extends forward and terminates in a button 700 that projects through the front wall of the casing 653. When the button 700 is pressed the lever 655 will be lifted, permitting the switch 650 to close, provided, of course, that the lever 655 is not locked either by the shouldered arm 658 or the hook 682. The button 700 may be threaded upon the rod 699 so that whenever it is desired to return to token control of delivery of the orders, the button may be unscrewed from the rod 699 and manual control will then be eliminated. The receptacle 686 is provided with a door 701 through which access may be had to the tokens in the receptacle. However, a lock 702 is provided to prevent unauthorized opening of the door.

As shown in Fig. 35 the solenoid 249 is connected in parallel with the solenoid 638 and both are controlled by the token switch 650, so that whenever a token is inserted in the token receiver to cause delivery of a dish of cakes from the storage chamber, the solenoid 249 is also actuated to set back the ratchet wheel 231 and hence the pin 260 as described above.

The diagram Fig. 35 also shows the order magnet or solenoid 249 controlled by a switch 705. This switch is shown in conventional form but in practice it may consist of a push button or a key located at an ordering point adjacent to or removed from the machine, as for example in the cashier's cage.

The body of the machine is suitably encased in a housing 706, Fig. 1, and a separate housing 707 covers the peel operating mechanism. The griddle, however, is exposed so that the baking of the cakes and the operation of the peels which project from the latter housing may be watched. An annular glass wall 708 fixed to the housing 706 surrounds the griddle to protect the same and at the same time to give a clear view of the cakes on the griddle.

While we have described a preferred embodiment of the invention, it will be understood that this is to be taken as illustrative and not limitative and that we reserve the right to make such changes in form, construction and arrangement of parts as fall within the spirit and scope of the following claims.

We claim:

1. A food preparing machine including a cooking receptacle, means for delivering food thereto to be cooked, food handling mechanism for picking up the food therefrom, and means controlled by the delivering means for actuating said mechanism at a predetermined time interval after each delivery of food to the receptacle.

2. A batter cake machine including a griddle, means for depositing a portion of batter thereon, a peel for picking up the batter cake from the griddle, normally inactive mechanism for operating the peel, and means actuated only at a predetermined time interval after the deposit of the batter for operating said mechanism.

3. A batter cake machine including a griddle, means for depositing portions of batter thereon, a peel for picking up the batter cakes from the griddle, normally inactive mechanism for operating the peel, and means controlled by the depositing means for actuating said mechanism at a predetermined time interval after each deposit of batter.

4. A batter cake machine including a griddle, means for depositing a portion of batter thereon, a peel adapted to turn the batter over upon the griddle, normally inactive mechanism for operating the peel, and means controlled by the depositing means for actuating said mechanism at a predetermined time interval after the deposit of the batter.

5. A batter cake machine including a griddle, means for depositing a portion of batter thereon, a peel for removing the batter cake from the griddle, normally inactive mechanism for operating the peel, and means controlled by the depositing means for actuating said mechanism at a predetermined time interval after the deposit of the batter.

6. A batter cake preparing and delivering machine, including a griddle, a batter depositor associated therewith, a cake turner for turning over a cake, a cake handling device for subsequently removing the cake from said griddle, and means controlled by the batter depositor for operating the cake turner and the cake handling device at predetermined time intervals respectively after the operation of the batter depositor.

7. A batter cake machine including a griddle, a depositor for depositing batter on the griddle, a peel spaced from the depositor, means for operating the peel to pick the batter cake off the griddle, means for moving the griddle to carry the batter cake from the depositor to the peel, and means operative only when the cake has reached the peel for actuating the peel.

8. A batter cake machine including a griddle, a depositor for depositing batter on the griddle, a peel spaced from the depositor, mechanism for operating the peel to pick the batter cake off the griddle, means for moving the griddle to carry the batter cake from the depositor to the peel, and means controlled by the depositor for actuating said mechanism when the batter cake reaches the peel.

9. A batter cake machine including a griddle, a depositor for depositing batter on the griddle, a cake removing peel spaced therefrom, a cake turning peel intermediate between the depositor and the removing peel, normally inactive mechanism for operating each peel, means for moving the griddle to carry the batter cake from the depositor to the turning peel and thence to the removing peel, and means for operating each peel only upon the arrival of the batter cake adjacent thereto.

10. A batter cake machine including a griddle, a depositor for depositing batter on the griddle, a cake removing peel spaced therefrom, a cake turning peel intermediate between the depositor and the removing peel, normally inactive mechanism for operating each peel, means for moving the griddle to carry the batter cake from the depositor to the turning peel and thence to the removing peel, and means controlled by the depositor for operating each peel upon arrival of the batter cake thereto.

11. In a cooking machine, a rotary griddle for cooking food, means for removing the food from the griddle, said means being normally inactive, and means for actuating the food removing means only when the food carried by the griddle has reached a predetermined position.

12. In a cooking machine, a rotary griddle, means at one point for depositing food on the griddle, means at another point for removing the food from the griddle, the latter means being normally inactive, and means for actuating the food removing means only upon arrival of the food adjacent thereto.

13. In a cooking machine, a rotary griddle, means at one point for depositing food thereon, means at another point for removing the food therefrom, and control means settable to actuate the removing means when the food has reached the latter point.

14. In a cooking machine, a rotary griddle, means at one point for depositing food thereon, means at another point for turning the food over on the griddle, and control means set by the depositing means for actuating the turning means when the food reaches the latter point.

15. In a cooking machine, a rotary griddle, means at one point for depositing food thereon, means at a delivery point for removing the food therefrom, means at an intermediate point for turning the food over on the griddle, and control means set by the depositing means to actuate the turning means when the food reaches said intermediate point and to actuate the removing means when the food reaches said delivery point.

16. In a cooking machine, a rotary griddle, means at one point for depositing food thereon, means at a delivery point for removing the food therefrom, means at an intermediate point for turning the food over on the griddle, and control means movable with the griddle and adapted to be set by the depositing means to actuate the turning means when the food reaches said intermediate point and to actuate the removing means when the food reaches said delivery point.

17. In a cooking machine, a rotary griddle, means for depositing food thereon, a peel for turning the food over the griddle, and a second peel for removing the food from the griddle, mechanism for operating each peel, a member rotatable in timed relation to the rotation of the griddle, controllers carried thereby and adapted to engage and actuate the peel operating mechanism, said controllers being normally in inoperative position, and means for setting one of the controllers in operative position at each actuation of the depositing means.

18. In a cooking machine, a traveling griddle, means at one position for depositing food thereon, means at a second position for turning the food over, and means at a third position for removing the food from the griddle, a member movable in timed relation to the travel of the griddle, pins carried by said member and vertically movable therein, means adjacent the depositing means for depressing a pin at each operation of the depositing means, and means actuated by engagement with a depressed pin at the turning and removing positions respectively for operating the turning means and the removing means.

19. In a cooking machine, a traveling griddle, means for depositing food thereon at one location, means for removing the food therefrom at another location, a series of heating units for the griddle, a controller for the heating units set by the depositing means to cause a wave of heat to accompany the food on the griddle, and means also controlled by said controller for actuating the removing means when the food reaches the latter location.

20. In a cooking machine, a traveling griddle, means for depositing food thereon at one location, means for turning the food over at a second location, means for removing the food from the griddle at a third location, a series of heating units for the griddle, a controller for the heating units set by the depositing means to cause a wave of heat to accompany the food on the griddle, and means also controlled by said controller for actuating the turning means and the removing means when the food reaches the second and third locations respectively.

21. In a batter cake machine, a rotary griddle, means for depositing batter thereon at one point, a peel at another point, a series of heating units under the griddle, a heat controller for each unit, a device set by the deposit of batter for operating the controllers successively in timed relation to the rotation of the griddle, and means controlled by said device for operating the peel to pick the batter cake off the griddle when said cake reaches the latter point.

22. In a batter cake machine, a rotary griddle, means for depositing batter thereon at one point, a peel at another point, an annular series of burners under the griddle, a valve for each burner, control means set by the deposit of batter on the griddle for operating the valves successively in timed relation to the rotation of the griddle, and means controlled by said control means for operating the peel to pick the batter cake off the griddle when said cake reaches the latter point.

23. In a batter cake machine, a rotary griddle, means for depositing batter thereon at one point, a delivery peel at another point, a turning peel at an intermediate point, a series of heating units under the griddle, a heat controller for each unit, a device set by the deposit of batter for operating the controllers successively in timed relation to the rotation of the griddle, and means controlled by said device for operating said peels when the batter reaches said peels respectively.

24. In a cooking machine, a rotary griddle, means at one point for depositing food on the griddle, means at a delivery point for removing the food from the griddle, a receptacle at the latter point to receive the food, the food removing means being normally inactive, and control means settable by the depositing means to actuate the removing means when the food reaches the delivery point.

25. In a cooking machine, a rotary griddle, means at one point for depositing food on the griddle, means at a delivery point for removing the food from the griddle, a receptacle at the latter point to receive the food, the food removing means being normally inactive, means controlled by the arrival of the food at the delivery point for actuating said removing means, and means for withdrawing the receptacle and replacing it with another when a predetermined quantity of food has been received thereby.

26. In a cooking machine, a rotary griddle, means at one point for depositing portions of food on the griddle, means at a delivery point for removing the food portions from the griddle, a receptacle at the latter point to receive the food portions, the food removing means being normally inactive, control means settable by the deposit means to actuate the removing means as each food portion reaches the delivery point, and means also controlled by said control means for withdrawing the receptacle and replacing it with another.

27. In a cooking machine, a rotary griddle, means at one point for depositing portions of food on the griddle, means at a delivery point for removing the food portions from the griddle, a receptacle at the latter point to receive the food portions, the food removing means being normally inactive, control means settable by the deposit means to actuate the removing means as each food portion reaches the delivery point, and means also controlled by said control means for withdrawing the receptacle and replacing it with another after a predetermined number of operations of the removing means.

28. In a cooking machine, a rotary griddle, means at one point for depositing food portions thereon, means at a delivery point for removing the food portions therefrom, a receptacle at the delivery point to receive the food from the removing means, control means movable with the griddle and adapted to be set by the depositing means to actuate the removing means as each food portion reaches the delivery point, and means also controlled by said control means for withdrawing the receptacle and replacing it with another after a predetermined number of operations of the removing means.

29. In a cooking machine, a rotary griddle, a receptacle means at one point for depositing food portions on the griddle, means at another point for removing the food portions from the griddle, a receptacle adapted to receive the food portions from the griddle, pins carried by said member and vertically movable therein, means for depressing a pin at each operation of the depositing means, means actuated by engagement with a depressed pin at the delivering position for operating the removing means, means operated by engagement with a predetermined number of pins for removing the receptacle and replacing it with another.

30. In a cake baking machine the combination with a rotary griddle, a series of fixed heating units therefor, a receptacle, means at one location for depositing batter on the griddle, a turner peel at another location for turning the batter cakes over on the griddle, a delivery peel at a third location for removing the cooked cakes from the griddle and depositing them on said receptacle, and means for withdrawing the receptacle, of a control wheel rotatable with the griddle, a series of pins vertically slidable in the control wheel, means for depressing one of said pins at each deposit of batter on the griddle, means controlled by the depressed pin for causing a wave of increased heat to accompany the batter cake, means also controlled by the depressed pin for initiating operation of each of said peels as the batter cake reaches said peels respectively, and means controlled by engagement with a predetermined number of depressed pins in succession for operating the receptacle withdrawing means.

31. In a cake baking machine the combination with a rotary griddle, a series of fixed heating units therefor, a set of receptacles, means at one location for depositing batter on the griddle, a turner peel at another location for turning the batter cakes over on the griddle, a delivery peel at a third location for removing the cooked cakes from the griddle and depositing them on one of said receptacles, and means for withdrawing the receptacle and replacing it with another, of a control wheel rotatable with the griddle, a series of pins vertically slidable in the control wheel, means for depressing one of said pins at each deposit of batter on the griddle, means controlled by the depressed pin for causing a wave of increased heat to accompany the batter cake, means also controlled by the depressed pin for initiating operation of each of said peels as the batter cake reaches said peels respectively, and means controlled by engagement with a predetermined number of depressed pins in succession for operating the receptacle withdrawing and replacing means.

32. In a cooking machine, a griddle, means for depositing food thereon, means for removing the food therefrom, means for wiping the griddle, control means adapted to be set by the depositing means to actuate the wiping means after each operation of the removing means.

33. In a cooking machine, a rotary griddle, means at one point for depositing food portions thereon, means at a delivery point for removing the food portions therefrom, control means adapted to be set by the depositing means to actuate the removing means as each food portion reaches the delivery point, and means also controlled by said control means for wiping that portion of the griddle from which the portion of food has been removed.

34. In a batter cake machine, a rotary griddle, means for depositing portions of batter thereon at one point, means for removing the batter cakes from the griddle at another point, the latter means being normally inoperative, a member rotatable with the griddle, pins carried by said member and vertically movable therein, means for depressing a pin at each operation of the depositing means, means actuated by engagement with a depressed pin at the delivery point for actuating the removing means, a wiping mechanism, and means actuated by engagement with said depressed pins for operating the wiping mechanism to clean the griddle after removal of each food portion therefrom.

35. In a cooking machine, a conveyor providing a cooking surface, mechanism at a depositing point for depositing food portions on said surface, a control device set by said mechanism to accompany each food portion on the conveyor, and means at relatively fixed points along the conveyor for conditioning said surface and handling said portions, said means being actuated by engagement with said control device.

36. In a cooking machine, a rotary element providing a cooking surface, a depositor at a relatively fixed location for depositing food portions on said surface, a plurality of means distributed at other relatively fixed locations along said element for conditioning said surface and handling the food portions deposited thereon, an annular series of control devices movable adjacent said means and in timed relation with said element, each control device being adapted when in active position to actuate said means sequentially by engagement therewith, and means adjacent the depositor for setting one said control device into active position at each operation of the depositor.

37. In a cooking machine, a rotary element providing a cooking surface, a depositor at a relatively fixed location for depositing food portions on said surface, a plurality of means distributed at other relatively fixed locations along said element for conditioning said surface and handling the food portions deposited thereon, an annular series of control devices movable adjacent said means concurrently with said element, each control device being adapted when in active position to actuate said means sequentially by engagement therewith, means for setting one of said control devices into active position at each operation of the depositor, and means for restoring each control device in active position to inactive position before it reaches the setting means.

38. In a griddle cake baking machine, a rotary griddle, an annular storage chamber immediately under the griddle, and means for transferring cakes from the griddle to said chamber.

39. In a griddle cake baking machine, a rotary griddle, a storage chamber under the griddle, means for depositing batter at one point on the griddle, and means controlled by the depositing means for removing the batter cakes from the griddle at another point and transferring them to said chamber.

40. In a griddle cake baking machine, a rotary griddle, an annular storage chamber coaxial with the griddle, a dish conveyor in said chamber, a support for a dish, means for removing cakes from the griddle and depositing them on the dish, and mechanism for transferring the dish from cake receiving position to said conveyor.

41. In a griddle cake baking machine, a rotary griddle, an annular storage chamber under the griddle, a dish conveyor in said chamber, a support for a dish, means for removing cakes from the griddle and depositing them on the dish, and mechanism cooperating with the cake removing means to transfer the dish to said conveyor after the predetermined number of operations of the cake removing means.

42. In a griddle cake baking machine, a rotary griddle, an annular storage chamber under the griddle, a dish conveyor in said chamber, a dish handling mechanism for transferring a dish from cake receiving position to said conveyor, means for depositing cake portions of batter on the griddle at one point, means at another point for transferring the batter cakes from the griddle to the dish, and means controlled by the depositing means for actuating the dish handling mechanism after a predetermined number of cakes have been transferred to the dish.

43. In a machine of the character described, means for cooking food portions, a storage chamber, means for introducing the cooked food portions into the storage chamber, and a register for indicating the number of food portions therein.

44. In a machine of the character described, means for cooking food portions, a storage chamber, means for introducing the cooked food portions into the storage chamber, a conveyor in the storage chamber adapted to move the food portions toward a delivery point, and signals for indicating the progress of the food portions toward said point.

45. A machine of the character described having a rotary griddle adapted to bake food portions, an annular storage chamber under the griddle, means for transferring baked food portions from the griddle to the storage chamber, a conveyor in the chamber adapted to convey the food portions to a delivery point in the chamber, and token controlled means at the latter point for ejecting the food portions radially from the storage chamber.

46. A machine of the character described having a rotary griddle adapted to bake food portions, an annular storage chamber under the griddle, means for transferring baked food portions from the griddle to the storage chamber, a conveyor in the chamber adapted to convey the food portions to a delivery point in the chamber, means for indicating the progress of each food portion toward said point, and token-controlled means at the latter point for ejecting the food portions radially from the storage chamber.

47. In combination, a griddle, means for heating the same, means for depositing raw food portions on the griddle, and means for arresting the depositing means when the temperature of the griddle departs from a predetermined thermal range.

48. In combination, a thermally expansible griddle, means for heating the griddle, means for depositing raw food portions on the griddle, and means controlled by expansion of the griddle for arresting the depositing means when the temperature of the griddle departs from a predetermined thermal range.

49. In combination, a thermally expansible and contractable griddle, means for heating the griddle, means for depositing raw food portions on the griddle, and means controlled by contraction of the griddle for arresting the depositing means when the temperature of the griddle drops below a predetermined limit.

50. In a griddle cake baking machine, a griddle, a storage chamber under the griddle, means for removing cakes from the griddle and depositing them on a dish, and means for conveying the dish into said chamber.

51. In a batter cake baking machine having a rotary griddle, a rotary conveyor screw extending transversely across the face of the griddle, a flexible mounting for the screw adapted to hold the same in contact with the griddle, a scraper blade in the form of a semicylindrical shell concentric with the screw, and a spring pressing the scraping edge of the blade into scraping contact with the surface of the griddle.

52. In a machine of the character described, means for cooking food portions, a storage chamber, means for introducing the cooked food portions into the storage chamber, a conveyor in the chamber adapted to move the food portions toward a delivery point, and separate delivery means at said point operable to eject the food portions.

53. In a machine of the character described, means for cooking food portions, a storage chamber, means for introducing the cooked food portions into the storage chamber, a conveyor in the chamber adapted to move the food portions toward a delivery point, and separate means at said point for ejecting the food portions, the last named means being token controlled.

54. In a griddle cake baking machine, a rotary griddle, an annular storage chamber coaxial with the griddle, a dish conveyor in said chamber, a support for a dish, means for removing cakes from the griddle and depositing them on the dish, mechanism for transferring the dish from the cake receiving position to said conveyor to be conveyed thereby to a delivery point, and delivery mechanism at said point operable to eject the dish from the storage chamber.

55. In a griddle cake baking machine, a rotary griddle, an annular storage chamber coaxial with the griddle, a dish conveyor in said chamber, a support for a dish, means for removing cakes from the griddle and depositing them on the dish, mechanism for transferring the dish from the cake receiving position to said conveyor to be conveyed thereby to a delivery point, and token controlled means at said point for ejecting the dish from the storage chamber.

56. In a griddle cake baking machine, a rotary griddle, an annular storage chamber coaxial with the griddle, a dish conveyor in said chamber, a support for a dish, means for removing cakes from the griddle and depositing them on the dish, mechanism for transferring the dish from the cake receiving position to said conveyor to be conveyed thereby to a delivery point, delivery mechanism at said point operable to eject the dish from the storage chamber, and means indicating the progress of the dish toward said delivery point.

HARRY RUSSELL BRAND.
CHARLES A. FAUSEL.